US012616955B2

(12) United States Patent
Binet et al.

(10) Patent No.: US 12,616,955 B2
(45) Date of Patent: May 5, 2026

(54) METAL-ORGANIC FRAMEWORKS FOR SELECTIVE ION EXTRACTION

(71) Applicant: Schlumberger Technology Corporation, Sugar Land, TX (US)

(72) Inventors: Florence Binet, Houston, TX (US); Dominic Perroni, Houston, TX (US); Gary W. Sams, Spring, TX (US); Prasanna Nirgudkar, Sugar Land, TX (US); Rod William Shampine, Houston, TX (US); Sharath Chandra Mahavadi, Lexington, MA (US); Arindam Bhattacharya, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/961,941

(22) Filed: Nov. 27, 2024

(65) Prior Publication Data

US 2025/0170555 A1     May 29, 2025

Related U.S. Application Data

(60) Provisional application No. 63/603,229, filed on Nov. 28, 2023.

(51) Int. Cl.
B01J 20/22 (2006.01)
B01D 15/20 (2006.01)
B01J 20/28 (2006.01)

(52) U.S. Cl.
CPC .......... B01J 20/226 (2013.01); B01D 15/203 (2013.01); B01J 20/28009 (2013.01); B01J 20/28042 (2013.01); B01J 20/2808 (2013.01)

(58) Field of Classification Search
None
See application file for complete search history.

(56) References Cited

U.S. PATENT DOCUMENTS

| | | | |
|---|---|---|---|
| 3,084,028 | A | 4/1963 | Foulletier |
| 3,306,700 | A | 2/1967 | Neipert |
| 4,291,001 | A | 9/1981 | Repsher |
| 9,068,247 | B2 | 6/2015 | Marston |
| 11,365,128 | B2 | 6/2022 | Marston |
| 12,280,322 | B2 | 4/2025 | Sams |
| 2011/0174739 | A1 | 7/2011 | Chung |
| 2014/0319058 | A1 | 10/2014 | Taylor-Pashow |
| 2014/0374104 | A1 | 12/2014 | Seth |
| 2018/0245180 | A1 | 8/2018 | Cheng |

(Continued)

FOREIGN PATENT DOCUMENTS

| | | |
|---|---|---|
| CN | 1511964 A | 7/2004 |
| CN | 104313348 A | 1/2015 |

(Continued)

OTHER PUBLICATIONS

Kumar, A. et al., "Metals Recovery from Seawater Desalination Brines: Technologies, Opportunities and Challenges", ACS Sustainable Chemistry Engineering, 2021, 9, pp. 7704-7712.

(Continued)

*Primary Examiner* — Kara M Peo
(74) *Attorney, Agent, or Firm* — Kyle R. Miiller

(57) ABSTRACT

A metal-organic framework (MOF) may include a body including a MOF crystal having a composition selected to selectively extract one or more elements of interest from an aqueous solution. The MOF may include a plurality of MOF crystals bound by a bonding agent.

8 Claims, 7 Drawing Sheets

(56) References Cited

U.S. PATENT DOCUMENTS

| | | | |
|---|---|---|---|
| 2019/0248667 A1 | 8/2019 | Featherstone |
| 2019/0256368 A1 | 8/2019 | Marston |
| 2020/0189924 A1 | 6/2020 | Featherstone |
| 2020/0261885 A1 | 8/2020 | Queen |
| 2021/0087697 A1 | 3/2021 | Riabtsev |
| 2022/0055910 A1 | 2/2022 | Jariwala |
| 2022/0134307 A1 | 5/2022 | Sadiq |
| 2022/0161230 A1 | 5/2022 | Britt |
| 2022/0168706 A1 | 6/2022 | Queen |
| 2023/0032153 A1 | 2/2023 | Sams |
| 2023/0086861 A1 | 3/2023 | Perroni |
| 2023/0088458 A1 | 3/2023 | Sams |
| 2023/0356107 A1 | 11/2023 | Sams |
| 2023/0364560 A1 | 11/2023 | Sams |
| 2023/0366062 A1 | 11/2023 | Sams |
| 2024/0025767 A1 | 1/2024 | Binet |
| 2024/0190723 A1 | 6/2024 | Binet |

FOREIGN PATENT DOCUMENTS

| | | | |
|---|---|---|---|
| JP | 2011032151 A | 2/2011 |
| JP | 2018172775 A | 11/2018 |
| WO | 2019221932 A1 | 11/2019 |
| WO | 2021061343 A1 | 4/2021 |
| WO | 2022040630 A1 | 2/2022 |
| WO | 2023009887 A1 | 2/2023 |
| WO | 2023009888 A1 | 2/2023 |
| WO | 2023064320 A1 | 4/2023 |

OTHER PUBLICATIONS

Li, Z. et al., "Continuous electrical pumping membrane process for seawater lithium mining", Energy Environmental Science, 2021, 14, pp. 3152-3159.

Liu, C. et al., "Lithium Extraction from Seawater through Pulsed Electrochemical Intercalation", Joule, 2020, 4, pp. 1459-1469.

Xu, W. et al., "A Comprehensive Membrane Process for Preparing Lithium Carbonate from High Mg/Li Brine", Membranes, 2020, 10, 14 pages.

Yang, S. et al., "Lithium Mteal Extraction from Seawater", Joule, 2018, 2, pp. 1648-1651.

Zhao, X. et al., "Review on the electrochemical extraction of lithium from seawater/brine", Journal of Electroanalytical Chemistry, 2019, 850, 113389, 13 pages.

METAL-ORGANIC FRAMEWORKS FOR SELECTIVE ION EXTRACTION

CROSS-REFERENCE TO RELATED APPLICATIONS

This application claims priority to U.S. Provisional Patent Application No. 63/603,229, filed on Nov. 28, 2023, entitled "MOF BODIES FOR SELECTIVE EXTRACTION OF AN ELEMENT OF INTEREST AND ASSOCIATED SYSTEMS, METHODS AND USES," which is hereby incorporated by reference in its entirety for all intents and purposes by this reference.

BACKGROUND TO THE INVENTION

Field of the Invention

The present invention relates to a monolithic metal-organic framework composite body. The monolithic metal-organic framework is targeted for adsorbing an element of interest, such as lithium, from an aqueous source. It also relates to associated apparatus and methods.

Metal-organic frameworks (MOFs) are porous crystalline materials prepared by the self-assembly of metal ions and organic ligands. MOFs can have large pore volumes and apparent surface areas as high as 8,000 $m^2/g$. MOFs combine a structural and chemical diversity that make them attractive for many potential applications, including adsorption of an element of interest. The host/guest interaction of the MOF may be built by choosing the appropriate building blocks, i.e., the metal ions and organic ligands, from which the MOF is formed.

Extracting an element of interest from an aqueous feed, such as lithium, nickel, cobalt, etc. using an adsorption/desorption process has been previously performed in the mining industry. In such adsorption/desorption processes, an extraction feed is contacted with the sorbent material in a vessel or a plurality of vessels in order to load the element of interest into the sorbent material. A depleted stream—i.e., extraction feed, stripped from the element of interest—is then removed from the vessel in order to be separated from the sorbent material and an eluent is circulated into the vessel so that the element of interest unloads from the sorbent and loads into the eluent, forming an eluate—i.e., the eluent loaded with the element of interest.

Some MOF compositions may be used as a sorbent for extracting an element of interest from an aqueous feed. However, MOFs generally have powdered morphologies. This makes it impractical to use the MOF in the extraction process with an aqueous feed as it complicates the separation of the sorbent and the depleted stream (e.g., lithium depleted stream) and makes maximal recovery of the element of interest difficult.

SUMMARY

In some aspects, the techniques described herein relate to a metal-organic framework (MOF). The MOF includes a body having a volume over 0.01 $mm^3$. The MOF includes a MOF crystal having a composition selected to selectively extract one or more elements of interest from an aqueous solution.

In some aspects, the techniques described herein relate to an apparatus for extracting an element of interest from an aqueous extraction feed. The apparatus includes a vessel. A plurality of metal-organic framework (MOF) bodies are loaded in the vessel, each of the plurality of MOF bodies including a monolithic MOF crystal. The processing system further includes a fluid tank. A fluid circulation device is in fluid communication with the fluid tank and the vessel. The fluid circulation device is configured to circulate a fluid from the fluid tank in the vessel so that the fluid contacts the plurality of MOF bodies.

In some aspects, the techniques described herein relate to a method of extracting an element of interest from an aqueous extraction feed. The method includes contacting the aqueous extraction feed with a plurality of metal-organic framework (MOF) bodies to yield a depleted feed, depleted of one or more elements of interest. The plurality of MOF bodies are loaded with the one or more elements of interest. Each of the plurality of MOF bodies includes a monolithic MOF crystal. An eluent is in contact with the plurality of MOF bodies loaded with the one or more elements of interest to yield an element of interest-containing feed.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
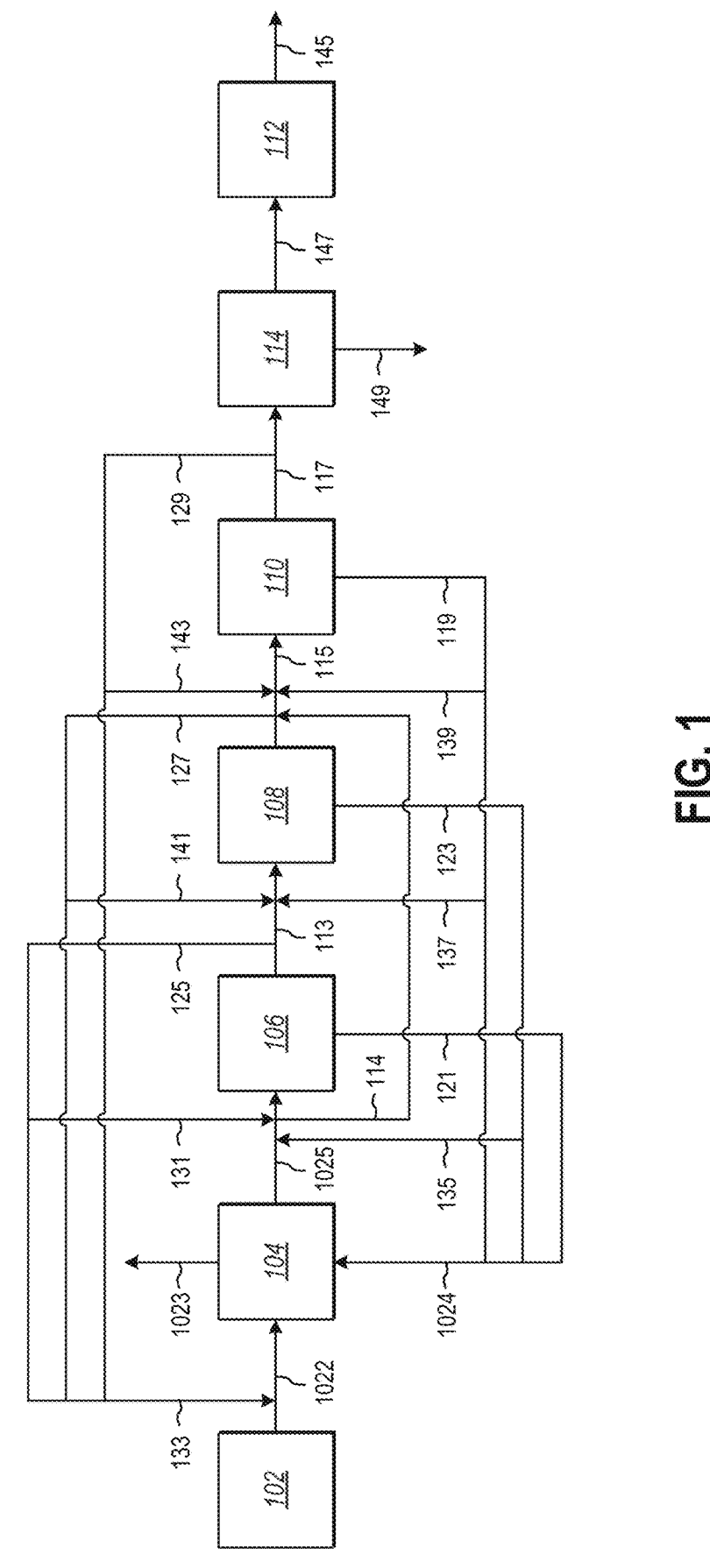
FIG. 1 is a schematic process diagram of a lithium recovery process, according to at least one embodiment of the present disclosure.

The present disclosure relates to a Metal-organic Framework (MOF) body comprising one or more MOF crystals having a composition designed to selectively extract one or more elements of interest from an aqueous solution, and having a volume over 0.01 mm³. Therefore, the MOF bodies may form beads usable in chemical extraction processes, such as adsorption/desorption.

By "selectively extracting," the MOF body extracts one or more elements of interest of a solution, the solution further containing additional elements (such as ions) that are not extracted or extracted at a lower concentration. In other words, the MOF body can be used to extract an element of interest from a solution containing several elements or compounds (for instance, extracting from a nickel-cobalt solution), such that a ratio of a concentration of the one or more elements of interest to the concentration of the one or more additional ions significantly increases after the selective extraction.

In particular, the MOF crystals have a composition that is selected to extract an ion from solution, including, but not limited to, one or more of lithium (Li), nickel (Ni), cobalt (Co), bromine (Br), uranium (U), copper (Cu), zinc (Zn), chromium (Cr), molybdenum (Mo), manganese (Mn), rare earth metals, palladium (Pd), lead (Pb), mercury (Hg), cadmium (Cd), thorium (Th), selenium (Se), fluorine (F), aluminum (Al), gallium (Ga), platinum (Pt), neodymium (Nd), dysprosium (Dy), terbium (Tb), praseodymium (Pr), iridium (Ir), boron (B), and so forth from a solution. In some examples, the MOF crystals may have a composition that is selected for use in mining or mineral extraction. In some examples, the MOF crystals may have a composition that is selected for use in water purification. As a specific, non-limiting example, the element of interest to extract may be lithium.

The MOF composition may have a composition that comprises a plurality of MOF crystals, where a first MOF crystal is configured to extract a first element of interest, for instance lithium (Li), and a second MOF crystal is configured to extract a second element of interest, for instance bromine (Br).

The MOF crystals may be monocrystals. For example, the MOF crystals may be formed, grown, or deposited in a manner that may form a single monolithic crystal structure. The monolithic crystal structure of the MOF may include a single crystal having a consistent crystal structure throughout the crystal volume of the crystal body. In some embodiments, the monolithic crystals may include intentional defects. For example, the monolithic crystals may include intentional defects such as cracks, voids, or imperfection in the regular geometrical arrangement of the atoms in a crystalline solid, or other defects that may enhance the performance of the MOF.

In accordance with at least one embodiment of the present disclosure, the composition of the bonding agent may be configured to facilitate attraction or transport of the target metal ions to the MOF crystals. For example, the composition of the bonding agent may include a MOF. In some examples, the bonding agent may include a MOF having the same composition as the MOF crystals in the MOF body. In some embodiments, the bonding agent may include a MOF having substantially the same composition as the MOF crystals in the MOF body. In some embodiments, the bonding agent may include a MOF having a different composition than the MOF crystal. For example, the bonding agent may include a MOF having a composition selected to attract different ions than the MOF crystal. In some embodiments, the bonding agent may include multiple MOFs.

In some embodiments, the MOF in the bonding agent may be formed in a non-crystallized or amorphous state.

The bonding agent may include additives, or ingredients or elements that are not MOFs. Such additives may be present in the MOF body in an additive volume percent (additive vol %). In some embodiments, the additive vol % may be in a range having an upper value, a lower value, or upper and lower values including any of 10%, 9%, 8%, 7%, 6%, 5%, 4%, 3%, 2%, 1%, 0.5%, 0.1%, 0.05%, 0.01%, 0.005%, 0.001%, or any value therebetween. For example, the additive vol % may be greater than 0.1%. In another example, the additive vol % may be less than 10%. In yet other examples, the additive vol % may be any value in a range between 0.1% and 10%. In some embodiments, it may be critical that the additive vol % is less than 10%.

In accordance with at least one embodiment of the present disclosure, the additives may include nanoparticles. For example, the additives may include magnetic nanoparticles. Magnetic nanoparticles may facilitate a magnetic separation and/or retention of the MOF bodies from the process fluid (solution). In some embodiments, the additives may remain inert to contaminants, including organic matters such as hydrocarbons and silica derivatives, and/or have low affinity with such contaminants. In some embodiments, inert additives may facilitate limiting fouling of the MOF bodies by the contaminants, thereby increasing the operating lifetime of the MOF bodies. Additives may also be selected to enhance the thermal conductivity of the MOF body. For example, increased thermal conductivity of the additives may increase the efficiency of the MOF body if the selective extraction is more efficient at higher temperatures.

In some embodiments, the MOF may include one or more magnetic properties. For example, the MOF may be or include one or more magnetic materials, elements or other elements that cause. In some embodiments, the additives and the MOF may exhibit magnetic properties. In some embodiments, a MOF and a magnetic particle, such as $Fe_3O_4$ may be formed separately and mixed. A magnetic MOF, or magnetic MOF body may facilitate magnetic separation of the MOF body from a solution, such as the extraction feed and/or the eluent. For example, a magnetic field may be applied to a tank or other container including the MOF bodies and the solution. The solution may be drained while the MOF bodies are attracted to the magnetic field, thereby retaining the MOF bodies while the solution is drained. This may help to reduce or eliminate waste of the MOF from the solution.

The bonding agent may include one or more features or functionality based on the content of the MOF and/or the additives to the bonding agent. For example, the bonding agent may be configured so that its properties (including the pore size and/or permeability) are tuned to limit residual water in the MOF body. This may help to increase the efficiency and/or effectiveness of the MOF body. In some embodiments, the porosity of the bonding agent may facilitate exposure to the MOF crystals to the solution.

In some embodiments, the bonding agent may include an attractant for the targeted metallic ion of interest. As a specific, non-limiting example, the bonding agent may include a sulfonate that results in high conductivity of the metallic ion of interest through the bonding agent to the MOF crystals. In some embodiments, the bonding agent may have low conductivity for other metallic ions. This may increase the purity of the resulting concentrated stream.

In some embodiments, the bonding agent may include an ion-sieve property. For example, the bonding agent may include pore sizes that prevent non-target ions from passing therethrough. For example, the bonding agent and/or the MOF crystals may include pore sizes of less than 1 nm to facilitate the passage of $Li^+$ ions and selectively prevent the passage of $Mg^{2+}$ ions. In some examples, selectivity between ions may be based on the valence of the ions. For example, the bonding agent may facilitate selective extraction of monovalent ions compared to divalent ions.

As discussed herein, a group or cluster of MOF crystals may be connected via a bonding agent or other connection medium. In some embodiments, the crystal structure of the monocrystals of the MOF may have an orientation. The orientation of the MOF crystals may be the longest direction of the MOF crystals, or a direction of one or more faces or edges of the MOF crystals. In some embodiments, when the MOF crystals are connected by the bonding agent, the MOF crystals may be oriented along different directions. For example, the MOF crystals may have a random orientation. In some examples, the MOF crystals may be arranged in any manner, including arranged in any orientation in the x, y, and z directions. In some embodiments, the MOF crystals may be oriented perpendicular to an outer surface of the bonding agent. In some embodiments, the MOF crystals may be oriented parallel or approximately parallel to the outer surface of the bonding agent. In some embodiments, the MOF crystals may be oriented to increase the surface area of the MOF crystals exposed to the solution.

The MOF body has mechanical properties that are stronger in comparison with the corresponding mechanical properties of the MOF crystals, such as a greater Young's modulus, and/or a greater density. The MOF body also has a stability over time that is greater in comparison with the MOF crystals.

The MOF body may have a spherical shape, a disk shape, or a tetrapod shape. Disk or tetrapod shapes may increase the interstitial spaces between a plurality of stacked MOF bodies and therefore increase the interstitial spaces between the stacked MOF bodies and limit interstitial solution that remains after selective extraction and sensitivity to suspended particles (or TSS).

The MOF body may have a BET surface area of at least 500 $m^2/g$. However, the MOF body has a surface area lower than the surface area of the MOF crystals contained in the body. For instance, the ratio of the BET surface area of the MOF body vs the BET surface of at least one of the MOF crystals it contains may be between 0.6-0.9.

The MOF body, and in particular the MOF crystals, may be selected so as to have a pore size that is below 1 nm. In some embodiments, the pore size of the MOF crystals may be determined based on the target ion. Such pore size is in particular used in relationship with lithium extraction and in view of the Li+ ion diameter. For instance, at least 30% of the pores have a diameter below 1 nm, preferably more than 50%, preferably more than 60%, or preferably more than 70%.

The MOF body may be monolithic.

The MOF body being immersed in brine, preferably has a high water stability.

The MOF body may include a metal of group IV metals, including one or more of Ti, Zr, or Hf.

The MOF body may include a MOF ligand that is a carboxylate. In some embodiments, the MOF ligand may include organic linkers or functionalized MOFs. In some embodiments, the MOFs may be functionalized with a carboxylic acid, including mono-carboxylic acid, bi-carboxylic acid, tri-carboxylic acid, or tetra-carboxylic acid. In some embodiments, the MOFs may be functionalized with hydroxyl groups. In some embodiments, the MOFs may be functionalized with nitrogen-containing heterocyclic structures. In some embodiments, the MOFs may be functionalized with a mixed functionalized group, including phosphates, pyrazolates, tetrazolates, catecholates, imidizaloates, sulfates, any nitrogen-bearing compounds, any sulfur-bearing compounds, any oxygen-bearing compounds, and combinations thereof.

Exemplary compositions of MOFs include UIO-66 $(C_{48}H_{28}O_{34}Zr_6)$, UIO-67 $(C_{84}H_{52}O_{32}Zr_6)$, MOF-808 $(C_{24}H_{16}O_{32}Zr_6)$, NU-1000 $(C_{88}H_{64}O_{32}Zr_6)$, ZIF-8 (C8H10N4Zn), ZIF-90 $(C_8H_8N_4O_2Zn)$.

Such MOF bodies may be manufactured by mixing MOF precursors (i.e., metal ion and ligand) in an appropriate solvent and drying at ambient conditions (optionally using mechanically enhanced drying methods). The drying stage may be performed in a mold so that the MOF bodies have a desired shape and size.

Device for Selective Extraction of Element of Interest Using MOF Bodies

Figure 6:
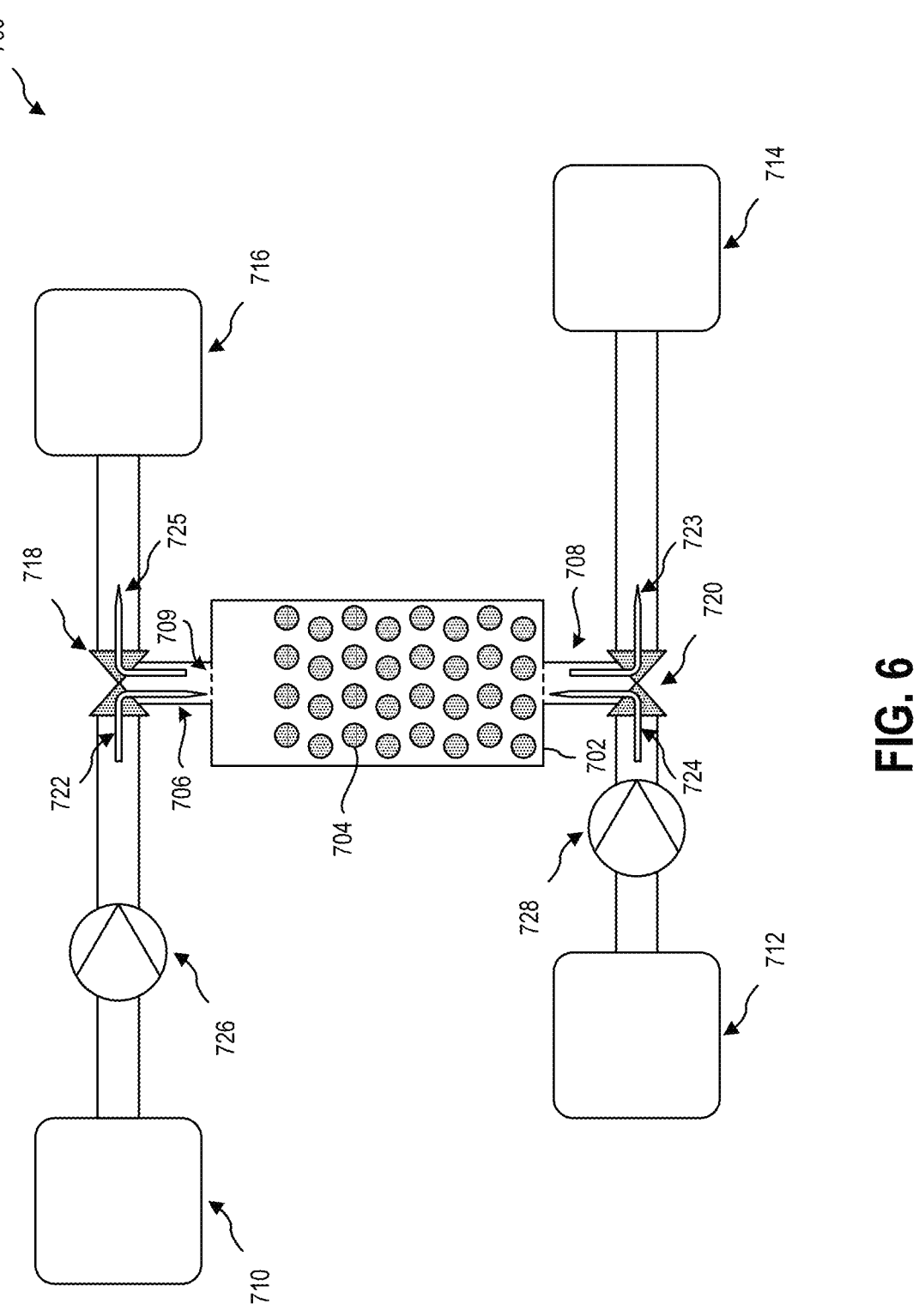
FIG. 6 is a representation of adsorption/desorption devices, according to at least one embodiment of the present disclosure.

The MOF bodies may be used as beads in an adsorption/desorption device 700 as described below and illustrated in FIG. 6. FIG. 6 shows an example of adsorption/desorption devices (fixed bed). However, the MOF bodies may be used with different types of adsorption/desorption systems, including moving beds, etc. Those systems are understood by those of ordinary skill and are not described in detail therein.

The device 700 includes a vessel 702 containing a plurality of stacked MOF bodies 704 according to one or more embodiments described herein. In particular, the vessel is filled with MOF bodies 704. The vessel 702 has at least an inlet and an outlet, wherein the one or more inlets are in fluid communication with a source 710 of an extraction feed containing the one or more elements of interest and a source of an eluent 712. The inlet(s) and outlet(s) are sized so that the MOF bodies 704 remain in the vessel 702 while the extraction feed and/or eluent flow into and out of the vessel 702. For instance, the inlet and/or outlet are equipped with filtration devices 709 so as to prevent passage from the MOF bodies 704 outside of the vessel 702.

In some embodiments, a body volume of the MOF bodies 704, including the MOF crystals and the bonding agent may be in a range having an upper value, a lower value, or upper and lower values including any of 0.001 $mm^3$, 0.002 $mm^3$, 0.003 $mm^3$, 0.004 $mm^3$, 0.005 $mm^3$, 0.006 $mm^3$, 0.007 $mm^3$, 0.008 $mm^3$, 0.009 $mm^3$, 0.010 $mm^3$, 0.011 $mm^3$, 0.012 $mm^3$, 0.013 $mm^3$, 0.014 $mm^3$, 0.015 $mm^3$, 0.016 $mm^3$, 0.017 $mm^3$, 0.018 $mm^3$, 0.019 $mm^3$, 0.020 $mm^3$, 0.025 $mm^3$, 0.030 $mm^3$, 0.040 $mm^3$, 0.050 $mm^3$, or any value therebetween. For example, the body volume may be greater than 0.001 $mm^3$. In another example, the body volume may be less than 0.050 $mm^3$. In yet other examples, the body volume may be any value in a range between 0.001 mm$^3$ and 0.050 mm$^3$. In some embodiments, it may be critical that the body volume is between 0.010 mm$^3$ and 0.025 mm$^3$ to increase the total surface area of the MOF.

In at least one embodiment, the vessel 702 includes 2 types of stacked MOF bodies 704 having distinct MOF crystals that selectively extract different elements of interest. For instance, a plurality of first MOF bodies 704 for selectively extracting a first element of interest, such as lithium, and a plurality of second MOF bodies 704 to extract a second element of interest, such as bromine.

The inlet for the extraction feed may be located at one end, for instance longitudinally, such as at an upper end of the vessel 702, while the inlet for the eluent may be located at the other end of the vessel 702.

In at least one embodiment, the vessel 702 has two fluid ports 706, 708. A first fluid port 706 at the first longitudinal end of the vessel 702 forms the inlet for the extraction feed in fluid communication with the source 710. A second fluid port 708, at the opposite longitudinal end of the vessel 702, forms the outlet for the lithium depleted stream (i.e., extraction feed that has been stripped of element of interest by the MOF bodies) and is in fluid communication with a tank 714 for storing the lithium depleted feed.

The second fluid port 708 also forms the inlet for the eluent and is in fluid communication with the eluent source 712. The first fluid port 706 forms the outlet for the lithium-rich feed (i.e., eluent loaded with ions stripped from the MOF bodies). The first fluid port 706 is also in fluid communication with a tank 716 for storing the lithium-rich feed.

The device 700 may include a plurality of fluid circulation devices in order to connect the one or more inlets/outlets to different sources such as tanks. The fluid circulation devices may include valves and/or circulation pumps to control the flow of the extraction feed and/or eluent in the column.

For instance, the device 700 may include a valve 718 coupled with the first fluid port 706 and a valve 720 coupled with the second fluid port 708. The valves 718, 720 enable direction of the fluid in a desired flow path. The valve 718, 720 may be controlled to either direct the fluid from the eluent source 712 to the vessel 702 (as shown by the arrows 724 representing eluent) and from the vessel 702 to the tank 716 (as shown by arrow 725 representing lithium-rich feed) or from the source 710 to the vessel 702 (as shown by the arrows 722 representing extraction feed) and from the vessel 702 to the tank 714 (as shown by the arrows 723 representing the lithium-depleted feed).

The device 700 may also include fluid circulation pumps 726, 728 to set the flows of the eluent and extraction feed, respectively.

The device 700 may also include sensors, such as sensors for measuring concentration at one or more of the inlets/outlets of the vessel.

The device 700 may also include one or more controllers in order to control the device 700 based on pre-calibrated parameter (such as a certain duration) or on measured parameters. For instance, the controller is able to switch the position of the valves 718, 720 and/or adjust the flow of the circulation pumps.

In the embodiment shown in FIG. 6, the device 700 has a specific configuration, but any other configuration enabling the device 700 to extract the element of interest from an extraction feed using MOF bodies is part of the current disclosure.

A few example variants are outlined below:

The vessel 702 includes more than one inlet/one outlet,

The flow of eluent and extraction feed are going (e.g., flow) in the same direction, The device 700 includes an additional tank and piping to provide a washing fluid in the vessel 702 between the extraction feed and eluent, The device 700 includes a plurality of vessels containing MOF bodies. The vessels may operate in series and/or in parallel. The vessels may also be at different stages at the same time (for instance, the extraction feed is circulating in the first vessel and loading the MOF bodies with the element of interest while the eluent is circulating in a second vessel unloading the MOF bodies) so that the element of interest is produced continuously.

The tank 710 and 714 may be the same or part of the feed obtained at the exit of the vessel may be routed back to the extraction feed source 710.

The device 700 is used in a method for extracting an element of interest from an extraction feed. This element of interest may for instance be lithium. The lithium will be used as an element of interest in the example method below, but the same method may be used for other elements of interest.

Method for Extracting an Element of Interest Using MOF Bodies

1. Extraction Stage Using MOF Bodies

FIG. 1 is a schematic process diagram of a lithium recovery process 100, according to one embodiment. The process 100 uses an extraction stage 104 that performs direct lithium extraction. An extraction feed 1022 is provided to the extraction stage 104 for adsorption/desorption using the MOF bodies and exits the extraction stage 104 as a lithium depleted feed 1023. The extraction stage 104 may be formed of and/or include the vessel 702.

The extraction feed 1022 may be circulated in the vessel, for instance until a certain condition is met (i.e., a certain time has lapsed, a certain concentration is measured in the fluid at the outlet of the vessel, etc.) The lithium depleted feed 1023 exiting the vessel may proceed to additional post-extraction stages, as will be described later.

An eluent 1024 is circulated in the vessel to strip the element of interest from the MOF bodies loaded therein. The flow rate of the eluent is selected to concentrate lithium to a selected range, for instance of about 1,500 ppm to 3,000 ppm. The eluent 1024 can be a water stream, which may be deionized, or a dilute brine stream having a low level of lithium ions, for example around 100 ppm. This changes the equilibrium in the vessel, leading to the eluent stripping the MOF bodies from the element of interest. Where low flow rate of the eluent 1024 is used to achieve higher concentrations of lithium in the lithium intermediate (or lithium-rich feed 1025), concentration of impurity ions can also increase in the extraction stage 104. Selectivity for lithium ensures that impurity concentration rises less than lithium concentration.

In one embodiment, the eluent starts circulating when a specific condition as outlined above is met. In such cases, for instance, the valves 718, 720 are switched which triggers circulation of the eluent into the vessel.

The lithium-depleted stream 1023 may be separated into a reject stream and a freshwater stream using at least a membrane separation operation having a semi-permeable membrane, or a thermal vaporizer. The reject stream may be returned to the environment (i.e., reinjected into the geological formation) and the freshwater stream may be recycled into another stream of the process 100. When a membrane separation operation is performed, such membrane separation may be configured to perform electrodialysis, reverse osmosis, counter-flow reverse osmosis, a combination of both reverse osmosis and counter-flow reverse osmosis such as described elsewhere herein. In that case, the lithium-depleted stream takes place of the lithium extract, the reject stream takes place of the lithium concentrate and the freshwater stream corresponds to the permeate stream.

Figure 3:
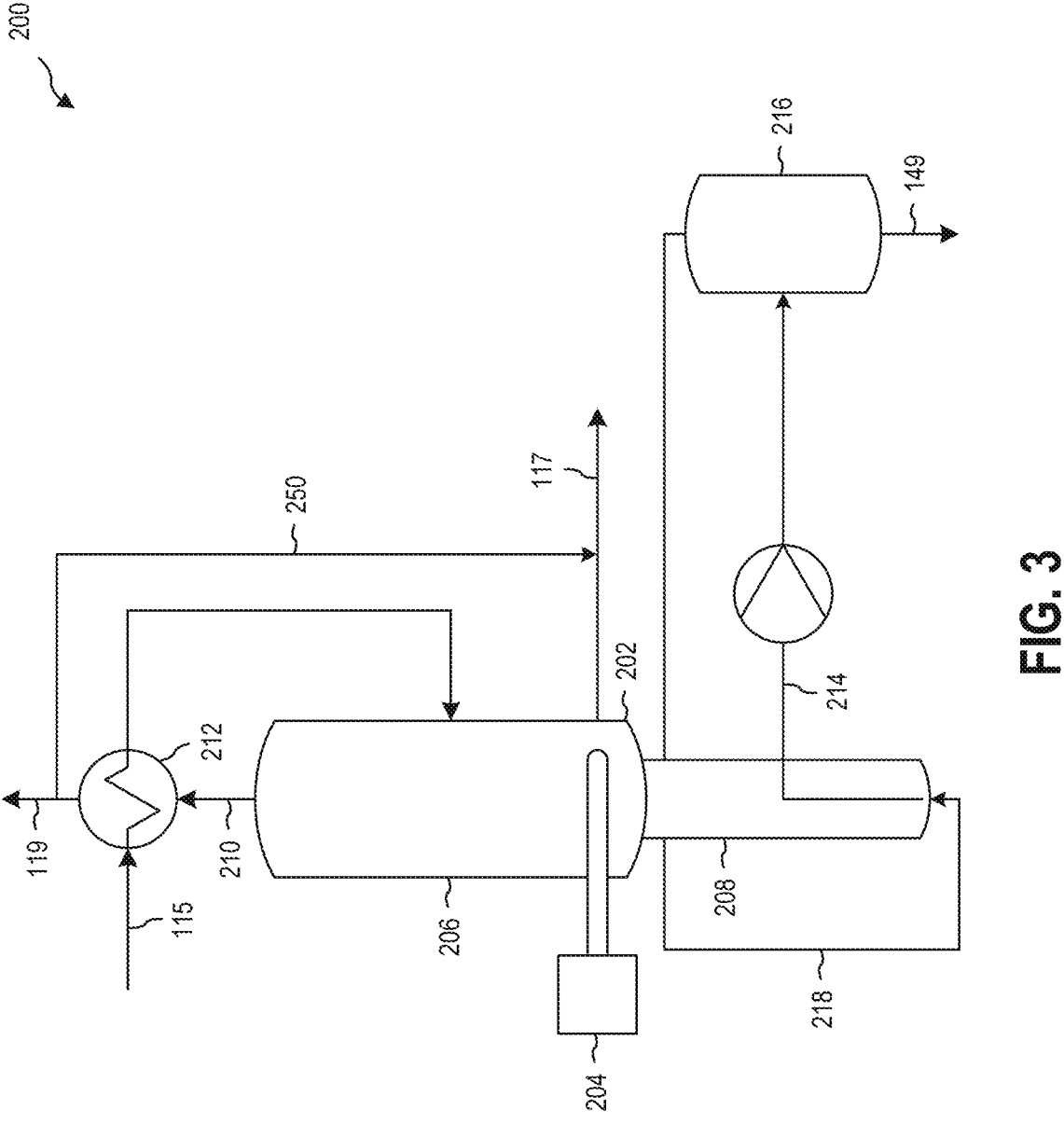
FIG. 3 shows exemplary extraction methods including an adsorption/desorption stage using MOF bodies, according to at least one embodiment of the present disclosure.

The extraction stage may be combined with many different other stages in order to optimize the extraction process. FIG. 3 shows exemplary extraction methods including an adsorption/desorption stage using MOF bodies as described herein.

2. Pre-Extraction Stages a. Pre-Extraction Setup

The extraction method may include one or more stages upstream of extraction.

In particular the extraction method may include one or more pre-extraction stages that apply one or more operations to an aqueous source to lead to the extraction feed. The pre-extraction stages may include one or more of:

a preconcentration stage, and/or a pretreatment stage.

A preconcentration stage is a stage for removing water from the aqueous source or a feed derived therefrom. It increases the total dissolved solids (i.e., TDS) of the aqueous source without significantly increasing the concentration of one element in view of the others. A preconcentration stage may include any water removal technique, alone or in combination, including membrane separation using, for instance, osmotic membrane systems (including forward osmosis, reverse osmosis, osmotically assisted reverse osmosis, counter-flow reverse osmosis) or evaporation (including, for instance mechanical forced evaporation). Examples of such water removal will be described in the following description (in relation with post-extraction stages) and are applicable mutatis mutandis to pre-extraction stages.

A pretreatment stage is a stage for removing at least an impurity from the aqueous source or a feed derived therefrom. It increases the ratio of the concentration of the element of interest and the concentration of one or more impurities. The pretreatment stage may be needed to increase the efficiency of the adsorption/desorption using the MOF bodies.

Exemplary pretreatment stages include one or more of the following, which may be removed using any technique and in any order:

organics removal (including hydrocarbons, bacteria, etc.), silica removal, sulfide removal (including $H_2S$, HS— or $S_2$—), suspended solids removal, transition metal removal, divalent impurity removal.

The preconcentration and pretreatment stage may be performed in any order. For instance, preconcentration may be performed before pretreatment or vice-versa. The pre-extraction stages may also include a plurality of preconcentration and/or pretreatment stages, each similar to or different from the previous ones, and the pre-extraction stages may include any arrangement of the pretreatments and/or preconcentration, for instance a first pretreatment before a preconcentration and a second pretreatment thereafter. In at least one embodiment, the pre-extraction stages include a first concentration stage using reverse osmosis, a pretreatment stage and a second concentration process using counter-flow reverse osmosis.

b. Exemplary Pretreatment Stage

A pretreatment stage according to at least one embodiment of the disclosure has been discussed in more detail. This pretreatment stage discloses a combination of four types of impurity removal in a certain order. This disclosure is however not limited to said combination of pretreatments. The same pretreatment may be applied in different orders, using different techniques or with additional intercalated treatments and/or concentration stage.

i. Removal of Suspended Solids

Removing suspended solids may include any appropriate technique, including for instance, filtering techniques and/or use of desanders, desilters, and/or hydrocyclones.

ii. Removal of Organics

Figure 7:
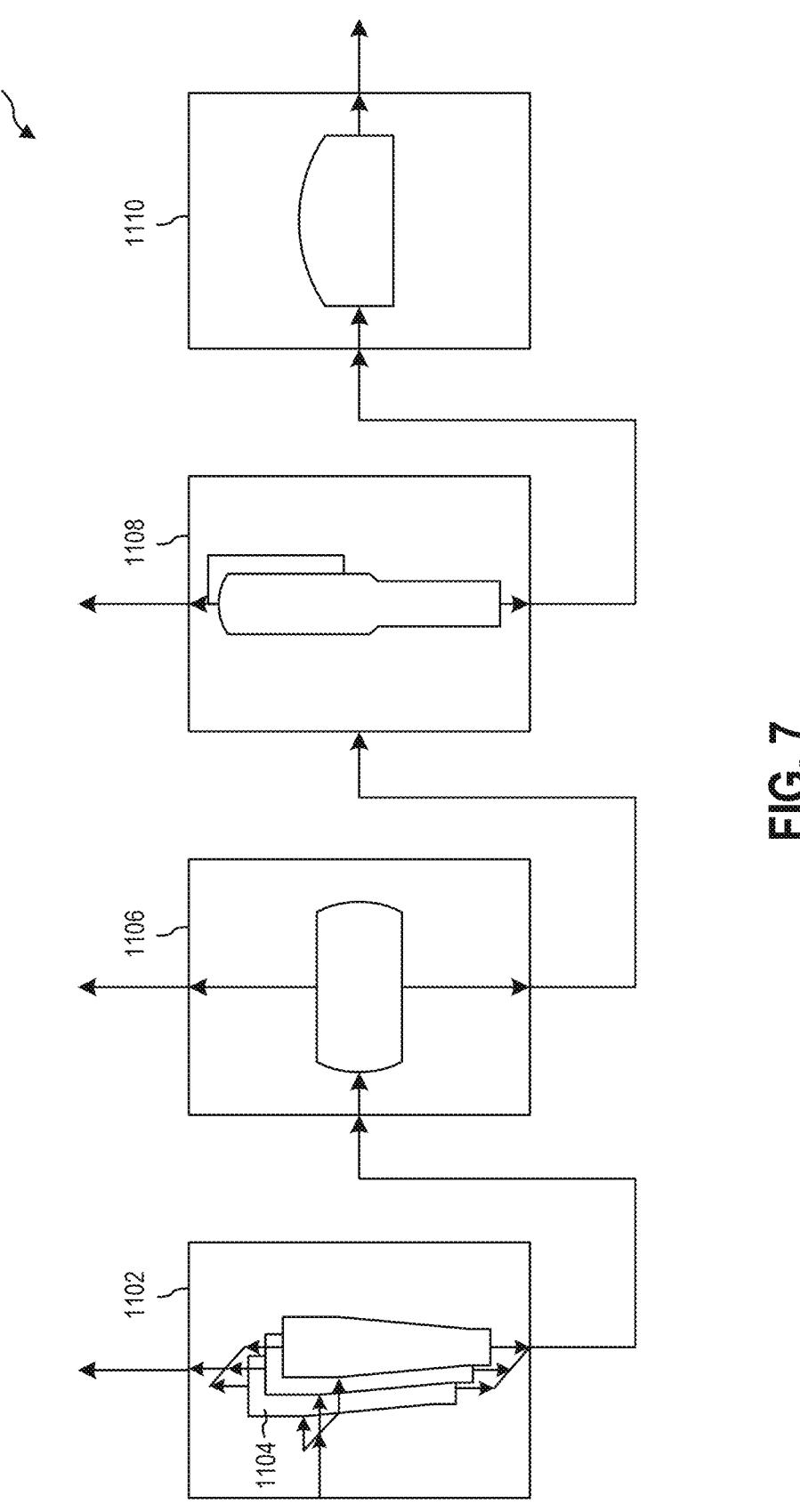
FIG. 7 is a process diagram of an example process for removing hydrocarbons and/or other organic species from an aqueous stream, according to at least one embodiment of the present disclosure.

Reducing concentration of organic species, which may be or may include hydrocarbons, may use one or more processes of gravity separation, gas flotation, filtering (e.g., membrane filtering), inducing coalescence, adsorption/desorption, and bacterial or microbial cleaning. FIG. 7 is a process diagram of an example process 1100 for removing hydrocarbons and/or other organic species from an aqueous stream. Emulsified oil or an oil phase may be removed using one or more of the techniques listed in Table 1. For instance, bulk oil may be removed using a gravity separator 1102, for example by use of one or more hydrocyclones 1104. Such bulk oils may include, or may be, condensate, light crude oil, medium viscosity crude oil, high viscosity crude oil, heavy oil or a combination thereof. Free oil can be removed using a filtration unit 1106, which may be a cross-flow scrubber. A cross-flow scrubber can be obtained from Schlumberger Ltd., of Houston, TX. Dispersed oil may be removed by a gas flotation unit 1108, which may be an EPCON dual compact flotation unit available from Schlumberger, Ltd. Polishing oil may be removed using a second filtration unit 1110, which can be a vessel holding a nutshell filter medium such as the HYDROMATION walnut shell filter media available from Schlumberger, Ltd. These units are shown in series, but such units can be configured in any suitable arrangement and/or bypassed or omitted as may be convenient for different processes. Chemical additives can be used to control scale, bacteria, corrosion, formation of emulsions, sulfur species, pH, alkalinity, or other characteristics. Bacterial or microbial treatment, as known in the art, can be used in addition to, or instead of, the techniques described above.

Reducing the concentration of organic species may also include use of granular activated carbon (GAC) as a medium in a filtering process and/or a counter-current adsorption desorption (CCAD) process. Such processes can use media selective to organic species as withdrawal material to withdraw organic species, such as specific target hydrocarbons, from an aqueous stream. In addition to or in place of the media, walnut shell media may be used. Other media that can be used include zeolites, metal-organic frameworks, and/or activated or nonactivated nanotubes. Such media can be used alone, or with other media described herein. Such media can be used in adsorption-desorption processes, for example, to separate organics, including hydrocarbons, from the aqueous stream.

The stage shown here is an example and may comprise additional operations, or may remove some operations depending on the nature of the contaminants. For instance, in some cases only bulk oil and dispersed oil may be removed, or only bulk oil and free oil, or only polishing oil, etc. Any combination of the operations above is covered by the present disclosure, and the equipment described below for each operation represents examples of equipment that can be used to perform the various operations. Appropriate additives can be added to the aqueous material (containing some type of oil) before one or more of the operations in order to enhance removal operations. Such additives may include any of the chemical additives enabling one or more of scale control, prevent bacteria or corrosion development, destabilize emulsions, adjusting pH or alkalinity, etc. The additives used may include any conventional additives and may be chosen in view of characteristics, such as temperature and impurity type and quantity, of the aqueous material.

Table 1 shows characteristics of types of non-dissolved oil (i.e., emulsified oil or oil phase) that can be removed or reduced in an aqueous material by the units of FIG. 1.

which can utilize electrical, chemical, pressure, vacuum, biological agents such as bacteria, or surface modification of a medium for removing organic species, including hydrocarbons.

iii. Removal of Sulfide Species

Reducing concentration of sulfide species in an aqueous material may include use of gas sparging in an open or closed system, membranes, adsorber media (such as the product Sulfatreat™ available from Schlumberger, Ltd.) chemical treatment, or any combination thereof. Reducing concentration of sulfides may include displacing sulfide species, oxidizing sulfide species using a chemical agent, or both. Displacing sulfide species can use air or inert gas, such as nitrogen, or both for displacing sulfide species out of the aqueous source or other aqueous stream to be used for direct aqueous extraction. Gas sparging is an example of a displacement technique in which a gas is flowed into a liquid containing sulfides, causing the sulfides to leave the liquid with the gas as the gas bubbles out of the liquid. The gas emerging from the liquid, and bearing sulfide species, can be routed to a flare or other combustion device, or to a sequestration system such as the SULFATREAT (mark of

TABLE 1

| Aqueous Oil Removal | | | | |
|---|---|---|---|---|
| Oil Type | Particle Size | Concentration | Products | Technology |
| Bulk Oil | >120-150 μm | >200-2000 ppmv | Unicel ® vertical skim, Vortoil ® presep. Hydrocyclone, Compact Flotation | gravity |
| Free Oil | >40 μm | >40-200 ppmv | Wemco ® Pacesetter ®, NATCO cross-flow scrubber, Vortoil deoiling hydrocyclone, Voraxial separator | Coalescence, gravity, centrifugal force |
| Dispersed Oil | >10 μm | >10-40 ppmv | Wemco ISF, Wemco Depurator, Unicel vertical IGF, TST CFU ™, EPCON compact flotation | Air bubbles, gas flotation |
| Polishing | >5 μm | >1-10 ppmv | Petreco ® Hydromation ® nutshell filter, Wemco Silver Band nutshell filter | Media filtration |

Each type of oil is characterized by a particle size (first column) and a concentration in the brine (second column). When there are different types of oil in the brine, the oil that has the larger particle size is generally removed first. The products that are indicated in the third column of Table 1 are commercial products, some of them available from Schlumberger, Ltd., which can perform the specified oil removal operations.

In addition to the non-dissolved organics, dissolved organic materials can also be removed using organic selective media, which can be solid, liquid, or gel. Many such materials are known in the art, and can be used for contacting with an aqueous stream containing dissolved organic materials. Such dissolved organic materials can include materials that partition from oil to water phase, such as acids and amines, and organic inhibitors for scale prevention, corrosion management, bacterial control, and emulsion control etc.

Reducing organics in the aqueous material to be used for ion recovery can also be performed by membrane processes, Schlumberger or a Schlumberger company) system available from Schlumberger, Ltd., of Houston, Texas, or an amine scrubbing system. Sulfide species may also react with other native species found in the brine, for example iron. This may involve a redox couple between a sulfur containing species and iron species or mediated by a biological agent. Reducing concentration of sulfide species in an aqueous material may also include use of a bio treatment process in which a biological agent, such as an organism, enzyme, or molecule that is a biologically active or living agent, or derived from a biologically active or living agent, is used to remove sulfide species, or facilitate removal of sulfide species, from the aqueous material.

Oxidizing sulfide species using a chemical agent may be configured so that the chemical agent reacts with sulfide species, such as $H_2S$, to yield in some reactions sulfuric acid ($H_2SO_4$). Any appropriate chemical agent may be used to oxidize sulfide species, and such chemical agents may be combined with other additives or catalysts, of which iron is one example. An exemplary composition that could be used to treat the brine is described in US Patent Application 2014/0374104, herein incorporated by reference. Triazines are also known sulfide removal agents, so various triazines, such as hexahydro-1,3,5-tris(hydroxyethyl)-s-triazine (MEA triazaine) or hexahydro01,3,50trimethyl-s-triazine (MMA triazine, also referred to as monomethylamine triazine) could be used to scavenge sulfide species from an aqueous stream. Another chemical agent known to remove sulfide species is dimethanol (ethylenedioxy). Different chemical agents in combination may also be used to treat different sulfide species.

The sulfide species could be temporarily sequestered from the aqueous source, or a stream derived from the aqueous source such as the extract, and then mixed with the ion depleted stream of the extraction stage. Such methods may be particularly applicable when displacement and/or gas sparging techniques are used.

In another embodiment, the sulfide species may be chemically converted to a reagent, for example an acid, and the reagent used in any stage of the method to adjust properties of a stream for processing. An acid formed from the sulfide species may for instance be used to adjust pH of one of the extraction feed and/or of the stream derived from the extraction feed i.e., before lithium extraction. As noted above, sulfide species can be converted to sulfuric acid using an oxidant such as sodium hypochlorite. The reaction produces sodium chloride as a byproduct, which can easily be removed at any stage of the methods described herein.

iv. Removal of Silica

Any conventional technique for removing silica may be implemented including use of chemical agents such as lime softening or iron hydroxide or adsorption methods.

3. Post-Extraction Stages a. Definition

After pretreatment and/or preconcentration and extraction, the extraction method according to the disclosure may include additional stages downstream of extraction. Such stages may include:

One or more impurity removal stages, to remove additional impurities that remain in the lithium-rich feed (also called lithium intermediate), and/or One or more concentration stages, and/or One or more conversion stages, to convert the nature of the lithium product extracted from the extraction feed (generally from lithium chloride to one of lithium hydroxide or lithium carbonate).

A concentration stage is a stage for removing water from the lithium-rich feed or a feed derived therefrom. It increases the total dissolved solids (i.e., TDS) of the feed without significantly increasing the concentration of one element in view of the others. A concentration stage may include any water removal technique, alone or in combination, including membrane separation using, for instance, osmotic membrane systems (including forward osmosis, reverse osmosis, osmotically assisted reverse osmosis, counter-flow reverse osmosis), or evaporation. Examples of such stages will be described in the following description.

An impurity removal stage is a stage for removing at least one impurity from the lithium-rich feed or a feed derived therefrom. It increases the ratio of the concentration of the element of interest to the concentration of one or more impurities. The impurity removal stage enables to remove some impurities that can remain in the feed after extraction using the MOF bodies.

Example impurity removal stages include one or more of the following, which may be removed using any technique and in any order:

silica removal, transition metal removal, divalent impurity removal, organics removal, monovalent impurity removal.

A conversion stage is to convert the product that will be formed in the feeds into another product. For instance, in brines, there are many chloride ions and, when the element of interest is lithium, lithium chloride is often the product at the output of the extraction method. A conversion stage will include chemical reactions to generate another product, such as lithium hydroxide or lithium carbonate in the case of lithium chloride.

The concentration and impurity removal stage may be performed in any order. Generally, impurity removal is performed before concentration but the disclosure is not limited to this setup. The post-extraction stages may also include a plurality of concentration and/or impurity removal stages, each similar or different from the previous ones, and may include any arrangement of the concentration and/or impurity removal stages, for instance a first concentration before an impurity removal and a second concentration thereafter. Concentration and/or impurity removal stages may be performed whether similar pre-extraction stages have been performed. The conversion stages are generally performed after the impurity removal and/or concentration have been performed.

b. Exemplary Post-Extraction Stages

A combination of post-extraction stages according to one embodiment of the disclosure has been discussed in more details below in relationship with FIG. 1. This disclosure is however not limited to said combination of stages. The same stages may be applied in a different order, using different techniques or with additional intercalated stages.

i. Impurity Preparation (Concentration) 106

Prior to removing impurities, concentration of the impurities can be increased to a level that optimizes the volume of water handled by the impurity stage. For most aqueous lithium streams, impurity removal is found to be most effective where impurity concentration is higher, so the lithium intermediate 1025 can be treated in an impurity preparation stage 106 prior to treatment at the impurity stage 108.

In the impurity preparation stage 106, water is first removed from some or all of the lithium intermediate 1025 to form an impurity stage feed 113 having elevated ion (i.e., lithium and impurity) concentration, along with a first removed stream 121, which may be a water stream or brine stream and that can be recycled elsewhere in the extraction method, for instance used as eluent 1024. In other words, the impurity preparation stage concentrates the lithium intermediate. The impurity preparation stage 106 is generally operated to increase concentration of one or more impurities in the impurity stage feed to a value near the solubility limit (for example, about 90% or 95% of the solubility limit) of the one or more impurities in the impurity stage feed. In at least one embodiment, the impurity preparation stage 106 is operated to raise a target divalent impurity, such as calcium, concentration in the impurity stage feed 113 to near the solubility limit in the eluent (for example, about 90% or 95% of the solubility limit in the eluent). Removal of calcium and other divalent ions is then performed in the impurity stage 108 at near-optimal conditions to maximize removal of divalent impurities.

Any known way of raising concentration in an aqueous fluid may be used during the impurity preparation stage 106. Such techniques may also be used in combination. For example, membrane processes, such as reverse osmosis ("RO"), nanofiltration ("NF," sometimes also referred to as "loose" RO), and osmotically assisted reverse osmosis, for example counter-flow reverse osmosis (such as CFRO® that is a counter-flow reverse osmosis product available from Gradient Corp. of Boston, Massachusetts, USA) can be used to remove water from an aqueous source. As another example, thermal methods using heat pumps, hot exhaust, solar radiation, and multi-effect evaporators may also be used. Evaporation, for example using cooling towers, atomizers, sprayers, and Carrier Gas Extraction® (also available from Gradient Corp.), may also be used to precipitate impurities and evaporate water. Combinations of such processes may also be used.

In at least one embodiment, the impurity preparation stage 106 may be configured to operate differently with different compositions of the lithium intermediate stream 1025, to increase concentration of one or more impurities in the feed to the impurity stage 108 to a value near the solubility limit of the one or more impurities, as set forth above.

As outlined above, the impurity preparation stage 106 is optional and the method may include an impurity stage 108 without impurity preparation stage 106.

ii. Impurity Removal

Divalent impurities, such as calcium and magnesium, are typically removed or reduced in the impurity stage 108. Any other impurity, including for instance, transition metals and/or organics could additionally or alternatively be removed or reduced at that stage. Impurity stage is a stage where one or more impurities are selectively removed or reduced, reducing the concentration of such impurities, while lithium concentration substantially remains the same. Any combination of membrane separation, ion exchange, electrostatic separation, and precipitation, may be selective to at least one type of impurity(ies) by using components made to be selectively permeable, chemically affinitive, non-permeable, or chemically non-affinitive for impurities. Some such components are described elsewhere herein.

An example of the impurity stage 108 includes solids filtration (for instance using clarification and/or filtering) for filtering the precipitated solids obtained during the impurity preparation stage 106. The impurity stage 108 may include additional stages such as selective removal of residual impurities, capture of divalent impurities such as calcium and magnesium using an ion exchange resin, precipitative methods, or an electrochemical process with an appropriate membrane to partition impurities. An ultrafiltration membrane that rejects divalent ions could also be deployed. The impurity stage may also include an additional precipitation stage to selectively precipitate some impurities using a chemical treatment, such as coagulation-flocculation, followed by solids removal as described above. Coagulation-flocculation may include the addition of $FeCl_3$ with a base to form a floc of $Fe(OH)_3$ used to remove suspended particles from the stream. The different treatments described herein as well as additional treatments for selectively removing any impurities may be implemented in any order. The impurity stage 108 results in a purified lithium stream 115 with high lithium concentration and very low concentration of impurities, such as divalent impurities.

iii. Second Concentration 110 (and Optional Solids Removal 114)

1. Concentration—Generalities

The purified lithium stream 115 that exits the impurity stage 108 can be routed to a second concentration stage 110. The post-extraction concentration stage 110 raises the concentration of lithium by a factor of about 10.

The second concentration stage 110 produces a lithium concentrate 117 and one or more removed streams 119 that may be water streams and brine streams. The water and brine streams 119 may be recycled (e.g., as stream 135, 121, 137, 123, 139 or a combination thereof) to parts of the process 100 where ion concentrations are lower to facilitate processing, for instance in the eluent 1024. A portion of the lithium concentrate 117 can also be recycled (e.g., as stream 133, 131, 125, 141, 127, 143, 129, or a combination thereof) and added to the extraction feed 1022 to raise the lithium concentration of the lithium source and/or dilute impurities at the brine source. Any process may be used to concentrate the lithium concentrate. Such process can include for instance one or more membrane separation processes and/or one or more evaporation processes (incl. forced evaporation processes) alone or in combination.

In at least one embodiment, a series of membrane separations are performed during the post-extraction concentration stage 110 to separate the lithium concentrate 117 with high lithium concentration, as a permeating stream, from a stream with low lithium concentration, as a non-permeating stream. The permeating stream, in this case, will also contain most impurities from the purified lithium stream 115. A vaporizer may alternatively or additionally be used to carry out the second concentration stage 110 to further concentrate the lithium salt in the lithium concentrate 117. Such vaporizer is used concurrently to perform solids removal 114.

2. Solids Removal (Generalities)

In at least one embodiment, monovalent impurities can remain in the purified lithium stream 115. In such cases, the second concentration stage 110 also concentrates any monovalent impurities that remains in the purified lithium stream 115. Sodium and potassium have lower solubility limits in water than lithium, so concentrating the purified lithium stream 115 may precipitate sodium and potassium, which may be removed as solids in a solids removal stage 114 taking place after second concentration 110.

Figure 2:
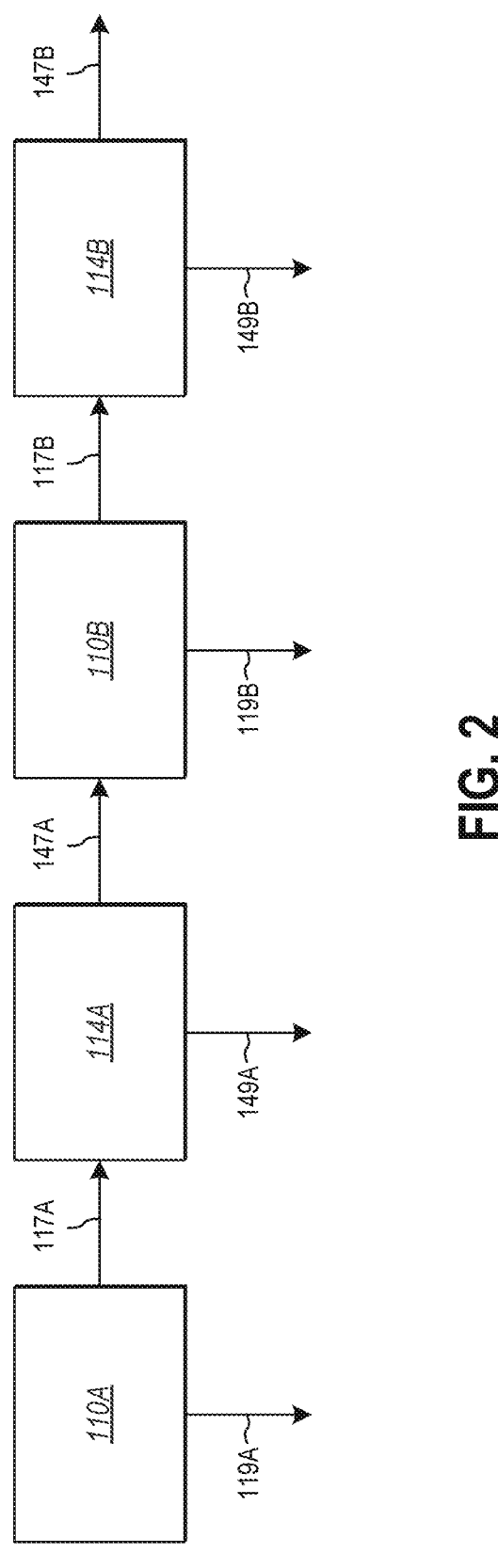
FIG. 2 is a schematic process diagram of a lithium recovery process, according to at least one embodiment of the present disclosure.

In at least one embodiment, the method may include a plurality of post-extraction concentration stages 110A, 110B, and may be a multi-operation concentrator with solids removal 114A, 114B between stages as shown on FIG. 2 that shows a variant of a portion of the method of FIG. 1. A multi-operation concentrator with integrated solids removal may then be used. The first post-extraction concentration stage 110A yields a first lithium concentrate 117A and a first brine (or low TDS) stream 119A that can be recycled elsewhere in the process. The first lithium concentrate 117A is routed to the first solids removal 114A that filters the precipitated solids within the second lithium concentrate as a first impurity slurry 149A. The first filtered lithium concentrate 147A is routed to the second post-extraction concentration stage 110B and is further concentrated, yielding a second lithium concentrate 117B and a second brine (or low TDS) stream 119B. The second lithium concentrate 117B is routed to the second solids removal 114B that filters the precipitated solids within the second lithium concentrate as a second impurity slurry 149B.

Each concentration operation can be configured to raise the concentration of lithium until impurities become a burden. Solids can then be removed using any filtration process and further concentration can proceed. The aqueous lithium sources contemplated for use in the process 100 can have sodium concentration several orders of magnitude higher than lithium concentration, for example at least 100, or at least 1,000 times the lithium concentration, so the post-extraction concentration stage 110 and solids removal stage can be quite effective in removing large quantities of sodium with relative ease. Moreover, as lithium concentration increases, solubility of sodium ions declines, so each absolute increment of increased lithium concentration yields more sodium precipitation. Sodium overwhelmingly precipitates as chloride salt in the second concentration stage 110, and solids can be removed by any suitable process including settling, centrifugation, vortex separation, and the like in the solids removal stage.

3. Exemplary Concentration Methods a. Using Evaporation

FIG. 3 is a schematic process diagram of a vaporizer 200 that can be used as, or as part of, the post-extraction concentration stage 110 and the solids removal stage 114. The example vaporizer 200 allows concentration of lithium and removal of solids. The vaporizer 200 includes a vaporization vessel 202 that receives the purified lithium stream 115. Heat is applied to the purified lithium stream 115 within the vaporization vessel 202 to vaporize water and concentrate lithium and other ions within the vessel 202. A heater 204 is coupled to the vessel 202 to apply heat to the fluid within the vessel 202. The heater 204 is shown here schematically as an element inserted into the interior of the vessel 202, but heat input can be accomplished in any convenient manner.

The vessel 202 generally has a vaporization section 206 and a precipitation section 208. Solids precipitate from the fluid as water is vaporized and solubility limits are reached. The vaporizer 200 is therefore also a precipitator of solids. Sodium precipitates as chloride, and potentially other salts due to trace amounts of other anions. Lithium generally remains in a concentrated solution, but some lithium salts can precipitate if enough water is removed by evaporation. Sodium solids generally settle below the lithium-rich solution due to density. The lithium solution is removed as the lithium concentrate 117, which is removed from a lower part of the vaporization section 206. Vaporized water is removed in an overhead stream 210 of the vaporization section 206. Heat is recovered from the vaporized water by thermally contacting the vaporized water with the purified lithium stream 115 in a heat exchanger 212. The heated purified lithium stream 115 is provided to the vaporization section 206 of the vessel 202, optionally using a valve or orifice to flash the heated purified lithium stream 115 within the vaporization section 206. The vaporized water is at least partially condensed in the heat exchanger 212, and a portion 250 of the vaporized water may be added to the lithium concentrate 117 to ensure all solids are dissolved prior to routing the lithium concentrate 117 to the conversion stage 112 of the process 100 (FIG. 1). The remaining vaporized water exits as the vaporizer water stream 119, which can be, or can be included in, one of the removed streams 119.

Sodium solids, mainly chloride, along with other impurities such as calcium, potassium, magnesium, and manganese, also including any anion impurities, also precipitate in the vaporization section 206 of the vessel 202, and due to higher density than the concentrated lithium solution settle into the precipitation section 208. Note that the vaporization section 206 of the vessel 202 is sized to provide residence time for sodium precipitates to settle into the precipitation section 208. A precipitate stream 214 is withdrawn from a lower portion of the precipitation section 208 and pumped to a settling vessel 216. The sodium solids, along with other dense impurities, settle in the settling vessel 216 and are removed as an impurity stream 149. Separated water or brine may be withdrawn from the settling vessel 216 and returned to the vaporization vessel 202 as a vaporization return stream 218 or recycled to any other location in the process (as explained below). Such vaporization return stream may be, or may be another part of, the removed stream 119. In this case, the water or brine is returned at the bottom of the precipitation section 208 to fluidize solids that may collect at the bottom of the precipitation section 208. The water or brine, or a portion thereof, can be returned to the vaporization vessel 202 at other points, or may be routed to other uses.

b. Using Membrane Separation (Osmotic Membrane)

Figure 4:
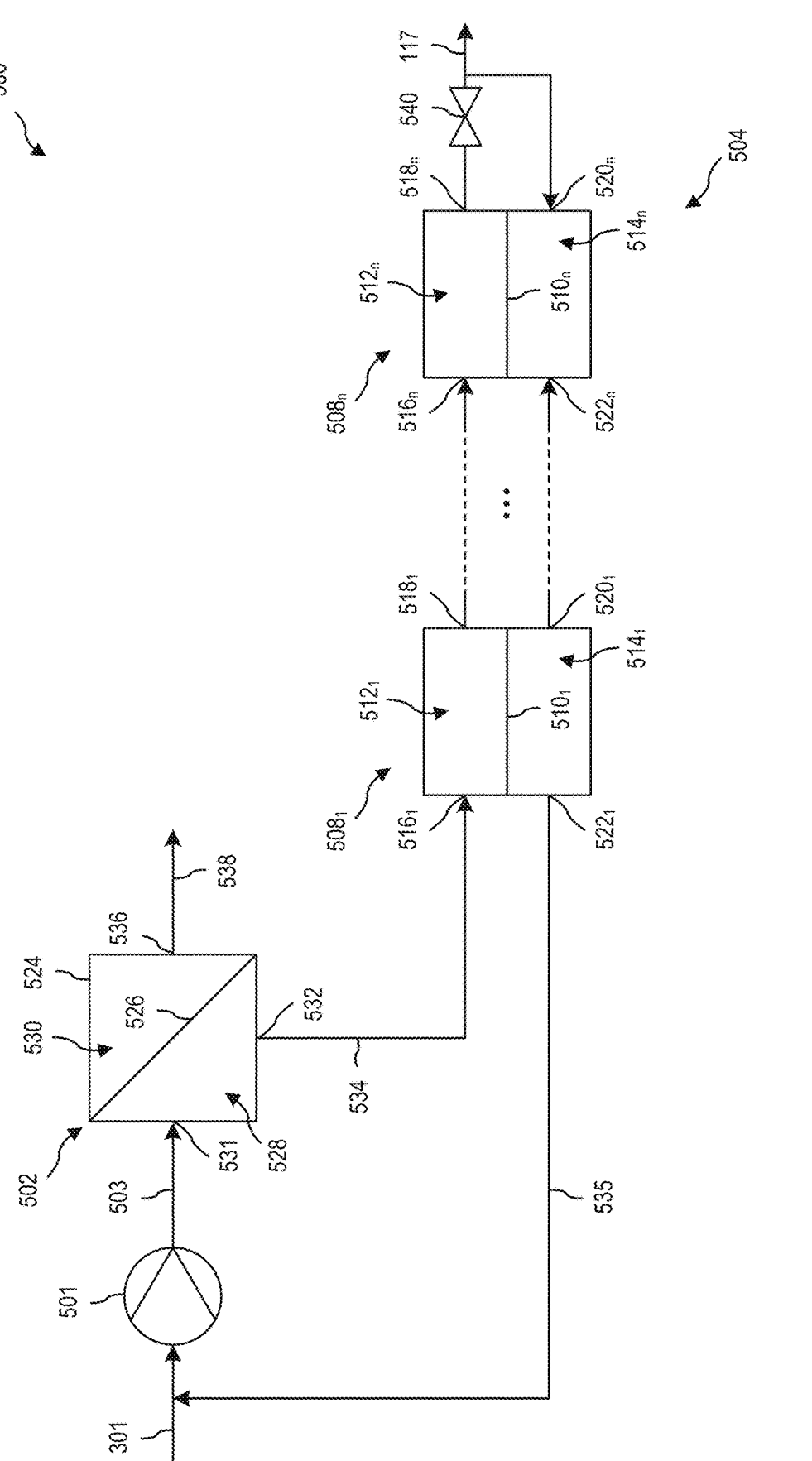
FIG. 4 is a schematic process diagram showing a concentration stage, according to at least one embodiment of the present disclosure.
Figure 5:
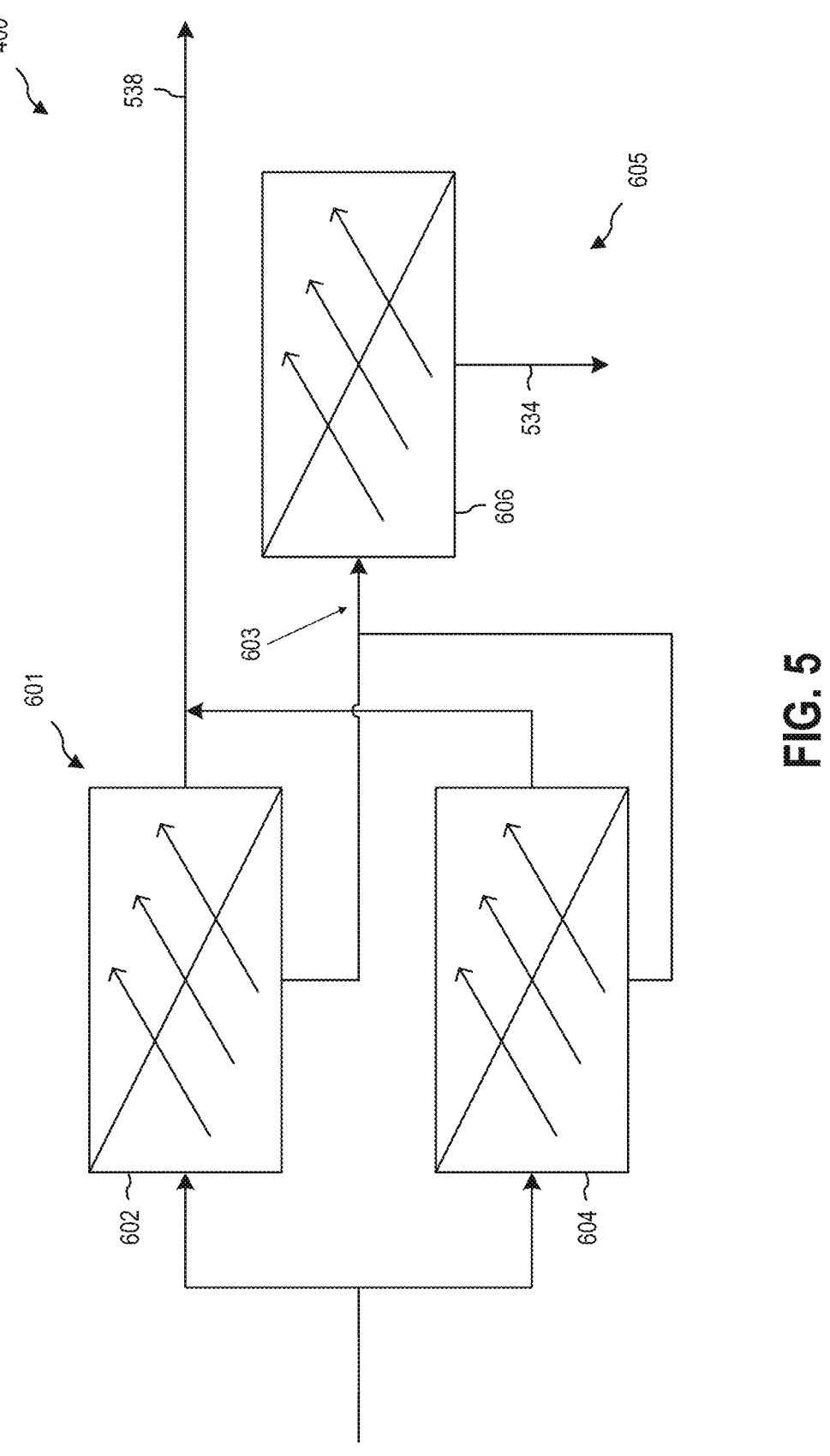
FIG. 5 is a schematic process diagram showing a concentration stage, according to at least one embodiment of the present disclosure.

FIGS. 4 and 5 are schematic process diagrams showing embodiments of a concentration stage, for instance a post-extraction concentration stage 110. In FIG. 4, a concentration stage 300 includes two different membrane separation operations in series, both pressure-driven: a reverse osmosis operation 502 and a counter-flow reverse osmosis operation 504. In this embodiment, the reverse osmosis operation 502 is upstream from the counter-flow reverse osmosis operation 504 (also designated osmotically assisted reverse osmosis). A lithium containing stream 301, which can be the aqueous source, lithium intermediate 1025 or the purified lithium stream 115 (FIG. 1), is pressurized to a target pressure (preferably less than or equal to 2000 psi) using a pump 501 to yield a pressurized stream 503, which is then provided to the reverse osmosis operation 502.

The reverse osmosis operation 502 is represented as including a RO container 524 that has a semi-permeable membrane 526 disposed therein, which may be a lithium selective membrane. The semi-permeable membrane 526 may be a reverse osmosis membrane, a nanofiltration membrane or more generally any type of membrane that enables water molecules to permeate while lithium ions mostly do not permeate. The membrane 526 separates the RO container 524 into a first volume 528 that receives a stream to be concentrated, here the pressurized stream 503, and a second volume 530 where permeating water molecules collect. The pressurized stream 503 enters the RO container 524 via an inlet 531 to the first volume 528. The RO container 524 also has a first outlet 532 of the first volume 528 through which a preconcentrated stream 534 containing a higher concentration of lithium than the pressurized stream 503 or the lithium containing stream 301 exits the RO container 524, and a second outlet 536 of the second volume 530 through which a dilute stream 538, having a lower concentration of lithium, that passed through the membrane (i.e. a permeate stream) exits the RO container 524.

The reverse osmosis operation 502 is represented in one stage with one container but it can also be in several stages, including a plurality of containers with identical or different semi-permeable membranes therein arranged in series. In such embodiments the preconcentrated stream 534 exiting a first RO container can be directed to the inlet of a second RO container to further concentrate the preconcentrated stream before a final preconcentrated stream is routed to the counter-flow reverse osmosis operation. In other such cases the permeate stream 538 can be directed to the inlet of an additional RO container to desalinate the permeate stream 538. In other embodiments, the reverse osmosis operation 502 may include a plurality of RO containers arranged in parallel.

FIG. 5 is a schematic process diagram of a reverse osmosis operation 400 that can be used as the reverse osmosis operation 502 (FIG. 4). The reverse osmosis operation 400 has a first stage 601, which is a parallel stage having two RO containers 602, 604 (more than two can also be used) in parallel and a second stage 605 in series with the first stage 601 and having a RO container 606 (more than one RO container in series can also be used here) configured to receive a concentrated stream (i.e. a non-permeate stream) 603 of each RO container 602 and 604 as input. The RO container 606 of the second stage 605 further concentrates the concentrated streams 603 to yield the preconcentrated stream 534 (FIG. 4). The reverse osmosis operation 400 is presented as an example of a way to arrange multiple RO containers in a reverse osmosis operation such as the reverse osmosis operation 502. Using RO containers in series during reverse osmosis operation 502 can reduce the number of stages of the counter-flow reverse osmosis operation 504 as well as maximize permeate recovery, which can be re-used into the process as explained above, therefore reducing freshwater demand. Indeed, the permeate of each container in this case may be recycled to one or more stages of the process, in particular as eluent of the lithium extraction stage 104.

Referring again to FIG. 4, the counter-flow reverse osmosis operation 504 uses a plurality of n units $508_1$-$508_n$, in series, each unit comprising a semi-permeable membrane $510_1$-$510_n$, each of which may be a lithium selective membrane. Each semi-permeable membrane 510 may be a reverse osmosis membrane, a nanofiltration membrane or more generally any type of membrane that selectively enables water molecules to permeate while lithium ions mostly do not permeate. The units 508 may all have the same type of membrane or different types of membranes. Each membrane $510_1$-$510_n$ separates each respective unit $508_1$-$508_n$ into a first volume $512_1$-$512_n$ to receive a stream to be concentrated, for a stream derived from the lithium containing stream 301, and a second volume $514_1$-$514_n$ to receive a non-permeating stream. The material that remains in the first volume 512 of each unit 508 is a permeating stream. Each unit comprises a first inlet $516_1$-$516_n$ to receive the stream to be concentrated and a first outlet $518_1$-$518_n$ to exit the concentrated stream (non-permeate stream) from the unit. Each unit 508 also has a second inlet $520_1$-$520_n$ to receive the non-permeating stream of another sequential unit and a second outlet $522_1$-$522_n$ to exit the non-permeating stream from the unit. Thus, for the units $508_1$-$508_{n-1}$, the permeating stream of the unit exits the first volume 512 of the unit and flows to the respective first volume 512 of the next unit in the series.

A stream derived from the preconcentrated stream 534 (ie the preconcentrated stream or a stream resulting from the preconcentrated stream passing through one or more intermediary stages), ultimately derived from a lithium bearing stream of the process 100, such as the lithium intermediate 1025 or the purified lithium stream 115, and non-permeating streams of the units 508 flow in counter-current directions. That is, the permeating streams flow from unit 1 to unit n, generally through the first volumes 512, while the non-permeating streams flow from unit n to unit 1, generally through the second volumes 514. The final permeating concentrated stream is collected at the first outlet $518_n$ of the $n^{th}$ unit $508_n$ and forms the lithium concentrate 117 (when using the operation 300 as the post-extraction concentration stage 110 of the process 100). The final permeating stream is collected at the second outlet $522_1$ of the first unit $508_1$ and yields a dilute brine stream 535 that may be recycled into the counter-flow reverse osmosis operation and/or recycled to one or more other stages of the process 100, for instance as a strip solution or as an eluent, for example with the eluent 1024, in the extraction stage. Under some circumstances, the final permeating stream collected from the second volume of the first unit $508_1$ may be a freshwater stream having TDS less than about 2000 mg/l. The number of stages n may be between 2 and 10, optionally between 3 and 6 to limit the costs while concentrating the stream to a target concentration. The concentration stage may also include a plurality of the counter-flow reverse osmosis operations 504 in parallel, each handling a portion of the flow to be concentrated.

In the embodiment shown in FIG. 4, the concentration stage 300 first comprises the reverse osmosis operation 502. The preconcentrated stream 534 is directed to the counter-flow reverse osmosis operation 504, while the permeate stream 538 that has a low TDS (less than 2,000 mg/l, preferably less than 500 mg/l and preferably around 100 mg/l) can be recycled to another stream of the process 100, for instance in the extraction stage 104 as eluent, for example with the eluent 1024, or any other stage of the process 100 where fresh water can be used. During the counter-flow reverse osmosis operation 504, the preconcentrated stream 534 passes through the n units $508_1$-$508_n$ and the resulting final permeating stream is collected at the first outlet $518_n$ of the $n^{th}$ unit $508_n$. The final permeating stream is depressurized, for example using a valve 540 or an orifice, and separated into a first portion that forms the lithium concentrate 117 (when used in the second concentration stage 110) and a second portion that is sent back to the units $508_1$-$508_n$ to flow through the second volumes 514 thereof along with non-permeating material. Using a lithium concentrate portion as a non-permeating stream in counter-flow reverse osmosis 504 increases operation efficiency. The depressurization may enable energy recovery by using the pressure of the final permeating stream exiting the nth first outlet $518_n$ to drive, for example, a generator coupled with a turbine.

In each unit 508, the lithium concentration of the permeating stream increases while the lithium concentration of the non-permeating stream decreases. That is, the permeating stream exiting unit m of the counter-flow reverse osmosis operation 504 at the respective first outlet $518_m$ has higher lithium concentration that the permeating stream exiting unit m−1 at first outlet $518_{m-1}$. Also, the non-permeating stream exiting unit m of the counter-flow reverse osmosis operation 504 at the respective second outlet $522_m$ has higher lithium concentration than the non-permeating stream exiting unit m−1 at second outlet $522_{m-1}$. Said another way, lithium concentration increases, in the operation 504, in streams flowing toward the $n^{th}$ unit and decreases in streams flowing toward the first unit. The dilute brine stream 535 may be recycled to the concentration stage 300 to recover any residual lithium in the dilute brine stream 535, or to any preceding stage of the process 100, as shown in FIG. 1. In the concentration stage 300, the dilute brine stream 535 can be mixed with the lithium containing stream 301. In another embodiment, the concentration stage 110 may include only the counter-flow reverse osmosis operation 504 and no reverse osmosis operation 502 depending on lithium concentration in the lithium intermediate 1025 and target concentration of the lithium concentrate 117. In such cases, a portion or all of the dilute brine stream 535 may be recycled to another stage of the process 100.

A concentration stage including counter-flow reverse osmosis operation 504, such as the concentration stage 300, enables a concentration ratio between the stream exiting the $n^{th}$ unit and the stream entering the first unit of 2 to 20. The concentration of the dilute brine 535 may be reduced to the point that a concentration ratio between the dilute stream entering the $n^{th}$ unit and the dilute stream exiting the first unit is 2 to 20. The stream entering the counter-flow reverse osmosis operation 504, for example the preconcentrated stream 534, has preferably a lithium concentration between 0.05% and 6% by weight, preferably between 0.5 and 3%. The lithium concentrate stream 117 at the exit of the counter-flow reverse osmosis operation 504 has a TDS (total dissolved solids) over 120,000 mg/l preferably over 200,000 mg/l and a lithium concentration over 2% by weight, preferably over 3.3% by weight. The dilute brine 535 at the second outlet 522₁ of the first unit 508₁ of the counter-flow reverse osmosis operation 504 has preferably a lithium concentration of less than 2% by weight, preferably less than 1.5% by weight. The counter-flow reverse osmosis operation 504 results in increased lithium concentration in the lithium concentrate 117, compared to a more conventional method such as simple reverse osmosis operation, by 3 to 4 orders of magnitude, allowing recovery of more than 80%, preferably more than 90%, of the volume of the lithium intermediate 1025 as the dilute brine stream 535, when used as the post-extraction concentration stage 110 of the process 100. The counter-flow reverse osmosis operation 504 is an example of a second membrane separation operation that increases TDS to over 120,000 mg/l. However, a second membrane separation operation having a different configuration and setup may also be used to reach such concentration, using, for instance, different equipment, flow patterns, etc. Such operation is also covered by the current disclosure.

Combining a reverse osmosis operation 502 and a counter-flow reverse osmosis operation 504 limits the capital cost of the concentration stage by limiting the number of units in the counter-flow reverse osmosis operation. Furthermore, combining the operations 502 and 504 results in a dilute stream of the reverse osmosis operation 502 that can be recycled as an eluent in the lithium extraction operation, significantly reducing the fresh water needed in the extraction stage 104 (fresh water being mainly used as the eluent 1024). In some cases, the dilute brine stream 535 can be recycled into a dilute brine target feed to one of the aqueous lithium source, the extraction feed 1022, the lithium intermediate 1025, the impurity stage feed, 113, or the purified lithium stream 115. The permeate stream 538 has a low lithium concentration and low TDS and is an efficient eluent, whereas the dilute brine stream 535 may have a higher TDS that may not directly enable to elute lithium efficiently from the withdrawal material of the extraction stage 104, or may pose higher barrier to diffusion of lithium through a membrane in an electrochemical process. In such cases the dilute brine stream 535 may be mixed with another stream having lower TDS, may be subjected to impurity removal before being used as eluent, or may otherwise be adjusted in composition for a target stream or operation of the process 100 to target a lithium concentration or ratio of lithium concentration to impurity concentration. A lower TDS stream, such as the permeate stream 538 can also be adjusted to target a lithium concentration or a ratio of lithium concentration to impurity concentration for a target stream or operation of the process 100.

In one additional embodiment, the dilute brine stream 535 may be treated using a separate reverse osmosis operation independent from the concentration stage 300 (downstream of the counter-flow reverse osmosis operation 504). In such cases, the reverse osmosis operation 502 can be optional. Any configuration or variation that concentrates lithium and yields fresh water (i.e., a water stream with TDS below 2,000 mg/l) that can be recycled elsewhere may be used as a post-extraction concentration stage 110.

The configuration of FIGS. 4 and 5 described in relationship with the post-extraction concentration stage 110 may also be used to increase lithium concentration as part of the feed preparation stage 102 or impurity removal preparation stage 106. Where such a concentration configuration is used in the feed preparation stage 102, the aqueous lithium source is the inlet stream to the RO container 524 and the feed for extraction is collected exiting the counter-flow reverse osmosis operation 504. A permeate stream, such as the permeate stream 538 obtained from the reverse osmosis operation 502, may also be recycled to other stages of the process 100 as described elsewhere in the application. When the feed preparation stage includes a first concentration process being reverse osmosis, a purification process and a second concentration process being counter-flow reverse osmosis, the feed preparation stage may be as described in relationship with FIGS. 4 and 5, with an intermediate purification process on the preconcentrated stream to yield a purified preconcentrated stream that enters the counter-flow reverse osmosis in the volume 512₁ of the first unit 508₁.

iv. Conversion

In at least one embodiment, the lithium concentrate 117 or filtered lithium concentrate 147 is routed to the conversion stage 112 that converts lithium chloride to lithium carbonate or lithium hydroxide, yielding a lithium product 145. The conversion can be performed by known chemical, electrochemical, and hybrid processes. The lithium product 145 can be a lithium hydroxide product or a lithium carbonate product. The lithium product 145 can be a liquid solution of lithium hydroxide or lithium carbonate, a slurry of solid lithium hydroxide in a solution of lithium hydroxide, or a slurry of lithium carbonate in a solution of lithium carbonate.

4. Variants

In at least one embodiment, the extraction method according to the disclosure comprises:

The adsorption/desorption stage using MOF bodies,

A concentration stage that uses any processes described above, optionally with a water stream obtained from the concentration stage being recycled into the adsorption/desorption stage, in particular as eluent.

Other variants may be possible, as explained herein in relationship to pre-extraction and post-extraction stages.

Also, any arrangement of pre-extraction stages may be combined with any arrangement of post-extraction stages.

INDUSTRIAL APPLICABILITY

Following are sections in accordance with at least one embodiment of the present disclosure.

1. A metal-organic framework (MOF) body having a volume over 0.01 mm$^3$ and comprising one or more MOF crystals having a composition selected to selectively extract one or more elements of interest from an aqueous solution.

2. The MOF body of section 1, wherein the one or more elements of interest includes one or more of lithium, nickel, cobalt, bromine, uranium, copper, zinc, molybdenum, rare earth metals and manganese.

3. The MOF body of the preceding section, wherein the one or more element of interest includes lithium.

4. The MOF body of any preceding section, including a bonding agent also including one or more MOFs.

5. The MOF body of section 4, wherein at least one of the one or more MOFs of the bonding agent have substantially the same composition as one of the MOF crystals.

6. The MOF body of sections 4-5, wherein at least a portion of the MOFs of the bonding agent is in a non-crystallized state.

7. The MOF body of sections 4-6 wherein the bonding agent includes additives, such as nanoparticles.

8. The MOF body of section 7, wherein the additives are selected for:
   a low affinity with a contaminant, wherein the contaminant is optionally one or more of a silica derivative and organic matter, such as hydrocarbon,
   a high thermal conductivity.

9. The MOF body of any preceding section, wherein at least the value of at least one property of the MOF body is greater than the value of the same property for the one or more MOF crystals, wherein the at least one property includes one of density and Young's modulus.

10. The MOF body of any preceding section, having a spherical shape, a disk shape or a tetrapod shape.

11. The MOF body of any preceding section, wherein the MOF body is monolithic.

12. The MOF body of any preceding section, wherein the MOF crystals have at least 30%, preferably 50%, preferably 70%, of the pores have a pore size below 1 nm.

13. The MOF body of any preceding section, wherein one or more of the MOF crystals include a metal of group IV metals, including one or more of Ti, Zr, or Hf.

14. The MOF body of any preceding section, wherein one of more of the MOF crystals include a ligand that is a carboxylate.

15. The MOF body of any preceding section, wherein the one or more MOF crystals have a composition included in the list hereinafter: UIO-66 ($C_{48}H_{28}O_{34}Zr_6$), UIO-67 ($C_{84}H_{52}O_{32}Zr_6$), MOF-808 ($C_{24}H_{16}O_{32}Zr_6$), NU-1000 ($C_{88}H_{64}O_{32}Zr_6$), ZIF-8 ($C_8H_{10}N_4Zn$), ZIF-90 ($C_8H_8N_4O_2Zn$).

16. The MOF body of any preceding section, wherein the one or more MOF crystals include at least a first MOF crystal selective to a first element of interest and at least a second MOF crystal selective to a second element of interest.

17. The MOF body according to one or more inventive principles as shown and described therein.

18. An apparatus for extracting an element of interest from an aqueous extraction feed, wherein the element of interest includes one or more of lithium, nickel, cobalt and manganese, wherein the apparatus includes a vessel containing a plurality of MOF bodies according to any one of sections 1-17, and including a plurality to fluid ports and fluid circulation devices in fluid communication with an extraction feed source and an eluent source, a depleted feed collector and a product feed collector, wherein the fluid port and fluid circulation devices are configured to:
   circulate an extraction feed in the vessel, so that the extraction feed contacts the MOF bodies and yields a depleted feed, depleted of the one or more element of interests, and direct the depleted feed to the depleted feed collector,
   circulate an eluent in the vessel, so that the eluent contacts the MOF bodies and yields an element of interest-containing feed, containing the one or more elements of interest, and direct the element of interest-containing feed to the product feed collector.

19. The apparatus of section 18, including one or more sensors for sensing one or more parameters including a concentration of the element of interest of the depleted stream, and a controller that controls the fluid circulation devices so that the eluent is circulated once the concentration in the depleted feed reaches a predetermined threshold.

20. The apparatus of section 18 or 19, including one or more sensors for sensing one or more parameters including a concentration of the element of interest of the element of interest-containing feed, and a controller that controls the fluid circulation devices so that the extraction feed is circulated once the concentration in the element of interest-containing feed reaches a predetermined threshold.

21. The apparatus of any sections 18-20, wherein the vessel is configured so that the MOF bodies remain in the vessel during extraction feed and/or eluent circulation.

22. The apparatus of any sections 18-21, wherein the plurality of MOF bodies includes a plurality of first MOF bodies having MOF crystals to selectively extract a first element of interest and a plurality of second MOF bodies having MOF crystals to selectively extract a second element of interest.

23. An apparatus according to one or more inventive principles as shown and described therein.

24. A method of extracting an element of interest from an aqueous extraction feed, wherein the element of interest includes one or more of lithium, nickel, cobalt and manganese, wherein the method includes:
   contacting the extraction feed with a plurality of MOF bodies as per sections 1-17 to yield a depleted feed, depleted of one or more elements of interest, and load the MOF bodies with the one or more elements of interest,
   contacting an eluent with the plurality of MOF bodies loaded with the one or more elements of interest, to yield an element of interest-containing feed.

25. The method of section 24, including measuring the concentration of at least an element of interest in the depleted feed and contacting the eluent with the MOF bodies when the concentration reaches a target concentration.

26. The method of section 24 or 25, including iteratively contacting the extraction feed and the eluent with the MOF bodies.

27. The method of section 26, including measuring the concentration of at least an element of interest in the element of interest-containing feed and contacting the extraction feed with the MOF bodies when the concentration reaches a target concentration.

28. The method of any of the sections 24-27, including one or more concentration stages to increase total dissolved solids in a stream derived from the element of interest-containing feed.

29. The method of section 28, wherein the one or more concentration stages include one or more of a membrane separation operation, including a reverse osmosis operation, a counter-flow reverse osmosis operation, and an evaporation operation, including a thermal or mechanical evaporation.

30. The method of section 29, wherein one or more concentration operations include a reverse osmosis operation upstream of a counter-flow reverse osmosis operation, wherein the reverse osmosis separates the element of interest-containing feed or derivative thereof into a preconcentrated stream and a permeate stream using a semi-permeable membrane.

31. The method of section 30, wherein the counter-flow reverse osmosis operation includes flowing the preconcentrated stream or derivative thereof into a plurality of reactors in series, each containing a semi-permeable membrane separating the reactor into a first volume and a second volume, wherein the preconcentrated stream or derivative thereof flows as a permeating stream sequentially into the first volume of each reactor and a non-permeating stream flows sequentially into the second volume of each reactor counter-current to the permeating stream, wherein the permeating stream exiting the plurality of reactors yields a concentrated stream and the non-permeating stream exiting the plurality of reactors yields a dilute brine stream.

32. The method of section 31, wherein the dilute brine stream is recycled into the reverse osmosis operation.

33. The method of any of the sections 24-32, further comprising an impurity removal stage to decrease the concentration of an impurity in the element of interest-containing feed or a derivative thereof to yield a purified feed.

34. The method of section 33, wherein the impurity removal stage decreases the concentration of at least one of:
silica,
transition metal,
divalent impurity,
organics,
monovalent impurity.

35. The method of section 33, wherein the impurity removal stage includes precipitation via coagulation-flocculation followed by solids removal and removal of divalent impurities using a selective ion exchange resin.

36. The method of any of the preceding sections 24-35, comprising a first concentration stage for concentrating the element of interest-containing feed and yield an impurity stage, followed by an impurity removal stage to remove one or more impurities from the impurity stage and yield a purified feed and a second concentration stage for concentrating the purified feed to yield a concentrate.

37. The method of section 36, further comprising a solids removal stage after the second concentration stage.

38. The method of any of the sections 24-37, further comprising a conversion stage for converting a first product containing at least one element of interest into a second product containing said at least one element of interest.

39. The method of section 38, wherein the element of interest is lithium and wherein the first product is lithium chloride and the second product is one of lithium hydroxide and lithium carbonate.

40. The method of any sections 24-39, including one or more pre-extraction stages to yield the extraction feed from an aqueous source, wherein the pre-extraction stages include:
one or more preconcentration stages, to increase the TDS of the aqueous source
one or more pretreatment stages, to decrease the concentration of at least an impurity in the aqueous source.

41. The method of the preceding section, wherein the one or more preconcentration stages include one or more of a membrane separation operation, including a reverse osmosis operation, a counter-flow reverse osmosis operation, and an evaporation operation, including a thermal or mechanical evaporation.

42. The method of the preceding section, wherein one or more preconcentration stages include a reverse osmosis operation, wherein the reverse osmosis separates a stream derived from the aqueous source into a RO concentrated stream and a permeate stream using a semi-permeable membrane.

43. The method of the preceding section, wherein one or more preconcentration stages include a counter-flow reverse osmosis operation, wherein the counter-flow reverse osmosis operation includes flowing the RO concentrated stream or a derivative thereof into a plurality of reactors in series, each containing a semi-permeable membrane separating the reactor into a first volume and a second volume, wherein the RO concentrated stream or derivative thereof flows as a permeating stream sequentially into the first volume of each reactor and a non-permeating stream flows sequentially into the second volume of each reactor counter-current to the permeating stream, wherein the permeating stream exiting the plurality of reactors yields a CFRO concentrated stream and the non-permeating stream exiting the plurality of reactors yields a dilute brine stream.

44. The method of the preceding section, wherein the dilute brine stream is recycled into the reverse osmosis operation.

45. The method of any sections 43 or 44, comprising a pretreatment stage to remove impurities in the RO concentrated stream to yield a purified RO concentrated stream, wherein the purified RO concentrated stream or a derivative thereof is concentrated using the counter-flow reverse osmosis operation.

46. The method of any sections 40-45, wherein the one or more pretreatment stages decrease the concentration of at least one of:
organics (including hydrocarbons, bacteria, etc.),
silica,
sulfide (including $H_2S$, HS— or $S_2$—),
suspended solids,
transition metal,
divalent impurity.

47. The method of the preceding section, including a sulfide pretreatment stage upstream of an organics pretreatment stage.

48. The method of the preceding section, including a solids pretreatment stage upstream of the sulfide pretreatment stage.

49. The method of section 47 or 48, including a silica pretreatment stage downstream of the organics removal stage.

50. The method of any sections 46-49, wherein the sulfide pre-treatment stage comprises:

displacing the sulfide species using a gas, optionally using air or inert gas, oxidizing the sulfide species using a chemical or biological agent that reacts with the sulfide species, withdrawing the sulfide species using withdrawal material in an adsorption-desorption process, optionally a counter-current adsorption-desorption (CCAD) process, or a combination thereof.

51. The method of any sections 46-50, wherein reducing the concentration of the organics comprises using gravity separation, electrochemical separation, chemical treatment, bacterial treatment, gas flotation, filtering, inducing coalescence and adsorption-desorption, such as counter-current adsorption desorption (CCAD), using granular activated carbon (GAC) in a filtering process, or any combination thereof.

52. The method of section 46-51, wherein the organic species includes non-dissolved organics and reducing the concentration of non-dissolved organics uses a gravity separation process, a filtering process, a gas flotation process, using organic selective media, or a combination thereof.

53. The method of any preceding section, wherein the plurality of MOF bodies includes a plurality of first MOF bodies having MOF crystals to selectively extract a first element of interest and a plurality of second MOF bodies having MOF crystals to selectively extract a second element of interest.

54. A method according to one or more inventive principles as shown and described therein.

55. Use of a MOF body as per sections 1-17 for extraction of one or more elements of interest via adsorption-desorption.

56. Use of a MOF body according to section 55, wherein the element of interest is one or more of lithium, nickel, cobalt, zinc, copper, uranium, bromine, chromium, molybdenum, rare earths and manganese.

57. Use of a MOF body according to section 55 or 56, wherein the element of interest includes lithium.

58. Use of a MOF body according to one or more inventive principles as shown and described therein.

59. Use of a plurality of MOF bodies according to sections 1-17, for extraction of a plurality of elements of interest, wherein the plurality of MOF bodies include at least a first MOF body selected to selectively extract at least a first element of interest and at least a second MOF body selected to selectively extract at least a second element of interest.

60. Use of a plurality of MOF bodies according to section 58, wherein the element of interest is one or more of lithium, nickel, cobalt, zinc, copper, uranium, bromine, chromium, molybdenum, rare earths and manganese.

61. Use of a plurality of MOF bodies according to section 58 or 59, wherein the element of interest includes lithium.

62. Use of a plurality of MOF bodies according to one or more inventive principles as shown and described therein.

What is claimed is:

1. An apparatus for extracting an element of interest from an aqueous extraction feed, the apparatus comprising:

a vessel comprising:

a first plurality of metal-organic framework (MOF) bodies, each of the first plurality of MOF bodies including a monolithic MOF crystal; and a bonding agent connecting the first plurality of MOF bodies, wherein the bonding agent comprises a second plurality of MOFs, wherein each of the second plurality of MOFs is in a non-crystallized state;

a fluid tank; and a fluid circulation device in fluid communication with the fluid tank and the vessel, the fluid circulation device configured to circulate an aqueous extraction fluid from the fluid tank in the vessel so that the aqueous extraction fluid contacts the first plurality of MOF bodies.

2. The apparatus of claim 1, further comprising a sensor configured to sense a concentration of the element of interest in the aqueous extraction fluid, and a controller configured to control the fluid circulation device so that the aqueous extraction fluid is circulated based on the sensed concentration.

3. The apparatus of claim 1, wherein the vessel is configured so that the first plurality of MOF bodies remains in the vessel while circulating the aqueous extraction fluid.

4. The apparatus of claim 1, wherein the first plurality of MOF bodies includes a plurality of first MOF bodies having monolithic MOF crystals to selectively extract a first element of interest and a plurality of second MOF bodies having monolithic MOF crystals to selectively extract a second element of interest.

5. The apparatus of claim 4, wherein the first element of interest and/or the second element of interest include at least one of lithium (Li), nickel (Ni), cobalt (Co), bromine (Br), uranium (U), copper (Cu), zinc (Zn), chromium (Cr), molybdenum (Mo), manganese (Mn), rare earth metals, palladium (Pd), lead (Pb), mercury (Hg), cadmium (Cd), thorium (Th), selenium (Se), fluorine (F), aluminum (Al), gallium (Ga), platinum (Pt), neodymium (Nd), dysprosium (Dy), terbium (Tb), praseodymium (Pr), iridium (Ir), or boron (B).

6. The apparatus of claim 1, wherein each of the first plurality of MOF bodies is oriented perpendicular to the bonding agent.

7. The apparatus of claim 1, wherein each of the first plurality of MOF bodies has a BET surface area of at least 500 m²/g.

8. The apparatus of claim 1, wherein the monolithic MOF crystal comprises UiO-66 ($C_{48}H_{28}O_{34}Zr_6$), UiO-67 ($C_{84}H_{52}O_{32}Zr_6$), MOF-808 ($C_{24}H_{16}O_{32}Zr_6$), NU-1000 ($C_{88}H_{64}O_{32}Zr_6$), ZIF-8 ($C_8H_{10}N_4Zn$), ZIF-90 ($C_8H_8N_4O_2Zn$), or any combination thereof.

* * * * *